(12) United States Patent
Mogaki

(10) Patent No.: US 9,571,494 B2
(45) Date of Patent: Feb. 14, 2017

(54) AUTHORIZATION SERVER AND CLIENT APPARATUS, SERVER COOPERATIVE SYSTEM, AND TOKEN MANAGEMENT METHOD

(71) Applicant: CANON KABUSHIKI KAISHA, Tokyo (JP)

(72) Inventor: Shunsuke Mogaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 279 days.

(21) Appl. No.: 14/001,658

(22) PCT Filed: Apr. 10, 2013

(86) PCT No.: PCT/JP2013/061344
§ 371 (c)(1),
(2) Date: Aug. 26, 2013

(87) PCT Pub. No.: WO2013/175901
PCT Pub. Date: Nov. 28, 2013

(65) Prior Publication Data
US 2014/0230020 A1  Aug. 14, 2014

(30) Foreign Application Priority Data

May 25, 2012 (JP) ................. 2012-120140

(51) Int. Cl.
*H04L 29/06* (2006.01)
*H04L 9/08* (2006.01)
(Continued)

(52) U.S. Cl.
CPC ............. *H04L 63/10* (2013.01); *G06F 21/335* (2013.01); *H04L 9/0891* (2013.01);
(Continued)

(58) Field of Classification Search
None
See application file for complete search history.

(56) References Cited

U.S. PATENT DOCUMENTS 8,219,802 B2    7/2012  Doleh
8,800,009 B1 *  8/2014  Beda, III ............ H04L 63/0846
                                                                713/155
(Continued)

FOREIGN PATENT DOCUMENTS

CN    102394887    3/2012
CN    102449976    5/2012
(Continued)

OTHER PUBLICATIONS

Vogt, Christian; Zitterbart, Martina. Efficient and Scalable, End-to-End Mobility Support for Reactive and Proactive Handoffs in IPv6. IEEE Communications Magazine. vol. 44, Issue: 6. Pub. Date: 2006. http://ieeexplore.ieee.org/stamp/stamp.jsp?arnumber=1668424.*
(Continued)

*Primary Examiner* — Jeremiah Avery
(74) *Attorney, Agent, or Firm* — Fitzpatrick, Cella, Harper & Scinto

(57) ABSTRACT

There is a method of generating a token required to transfer an access authority to a cooperating system to a cooperation asking system. In this method, a refresh token is issued to update a token without confirmation to a user after a valid period of a token has expired. When information which is required to update a token is leaked, an unintended system updates a token, and the cooperating system is illicitly used. For this reason, a unit for invalidating the leaked refresh token is required. An access management service stores a refresh token issued at the time of first authorization processing linked to tokens re-issued when a series of token is issued using refresh tokens. Then, upon designation of the
(Continued)

refresh token issued first, all refresh tokens linked to the refresh token issued first are invalidated.

9 Claims, 16 Drawing Sheets

(51) Int. Cl.
*H04L 9/32* (2006.01)
*G06F 21/33* (2013.01)
*H04L 29/08* (2006.01)

(52) U.S. Cl.
CPC ........ *H04L 9/3213* (2013.01); *H04L 63/0807* (2013.01); *H04L 67/1002* (2013.01); *G06F 2221/2101* (2013.01); *G06F 2221/2151* (2013.01)

(56) References Cited

U.S. PATENT DOCUMENTS

| | | | |
|---|---|---|---|
| 9,077,707 B2 | 7/2015 | Vrancken | |
| 2002/0083183 A1* | 6/2002 | Pujare | G06F 8/65 709/231 |
| 2009/0171982 A1* | 7/2009 | Hagan | G06F 21/6254 705/4 |
| 2009/0282239 A1 | 11/2009 | Doleh | |
| 2010/0138903 A1* | 6/2010 | Medvinsky | G06F 21/10 726/6 |
| 2010/0306547 A1* | 12/2010 | Fallows | G06F 21/305 713/178 |
| 2012/0054847 A1* | 3/2012 | Schultz | G06F 21/33 726/9 |

FOREIGN PATENT DOCUMENTS

| | | |
|---|---|---|
| JP | 2005-99980 | 4/2005 |
| JP | 2011-519087 | 6/2011 |
| WO | 2009/130007 | 10/2009 |

OTHER PUBLICATIONS

Kellil, Mounir; Romdhani, Imed; Lach, Hong-Yon; Bouabdallah, Abdelmadjid, Bettahar, Hatem. Multicast Receiver and Sender Access Control and Its Applicability to Mobile IP Environments: A Survey. IEEE Communications Surveys & Tutorials. vol. 2, Issue: 2. Pub. Date: 2005. http://ieeexplore.ieee.org/stamp/stamp.jsp?arnumber=1610545.*

Maciej P. Machulak, et al., "User-Managed Access to Web Resources", Proceeding DIM '10 Proceedings of the 6th ACM Workshop on Digital Identity Management, 2010, p. 35-44.

E. Hammer, "The OAuth 2.0 Authorization Protocol draft-ietf-oauth-v2-25", Oct. 9, 2012, <URLhttp://tools.ietf.org/html/draft-ietf-oauth-v2-25>.

Chinese Office Action issued Jun. 3, 2016 during prosecution of related Chinese application No. 201380027459.4. (Whole English-language translation included.).

* cited by examiner

FIG. 6A

AUTHORIZATION INFORMATION MANAGEMENT TABLE (600)

| COOPERATING SYSTEM NAME (601) | ACCESS TOKEN ID (602) | REFRESH TOKEN ID (603) | INITIAL REFRESH TOKEN ID (604) |
|---|---|---|---|
| FORM SERVICE SYSTEM | IJKL9012 | 4567EFGH | 0123ABCD |
| ... | ... | ... | ... |

FIG. 6B

AUTHORIZATION CODE TABLE (610)

| COOPERATING SYSTEM NAME (611) | AUTHORIZATION CODE ID (612) |
|---|---|
| FORM SERVICE SYSTEM | ABCD1234 |
| ... | ... |

FIG. 6C

AUTHENTICATION INFORMATION TABLE (620)

| COOPERATING SYSTEM NAME (621) | CLIENT ID (622) | PASSWORD (623) |
|---|---|---|
| FORM SERVICE SYSTEM | System01 | ********** |
| ... | ... | ... |

FIG. 7A

USER TABLE 700

| USER ID (701) | PASSWORD (702) |
|---|---|
| User01 | ******* |
| User02 | ******** |
| ... | ... |

FIG. 7B

CLIENT TABLE 710

| CLIENT ID (711) | PASSWORD (712) |
|---|---|
| System01 | ********** |
| System02 | ****** |
| ... | ... |

FIG. 8

| 801 AUTHORIZATION CODE TABLE 802 | 800 |
|---|---|
| AUTHORIZATION CODE ID | USER ID |
| ABCD1234 | User01 |
| WXYZ9876 | User02 |
| ... | ... |

FIG. 9

AUTHORIZATION INFORMATION MANAGEMENT TABLE (900)

| ACCESS TOKEN ID (901) | ACCESS TOKEN ISSUANCE DATE AND TIME (902) | ACCESS TOKEN VALID DATE AND TIME (903) | REFRESH TOKEN ID (904) | REFRESH TOKEN ISSUANCE DATE AND TIME (905) | REFRESH TOKEN VALID DATE AND TIME (906) | USER ID (907) | INITIAL REFRESH TOKEN ID (908) |
|---|---|---|---|---|---|---|---|
| EFGH5678 | 20120401120000 | 20120401130000 | 0123ABCD | 20120401120000 | 20120501120000 | User01 | null |
| IJKL9012 | 20120401130000 | 20120401140000 | 4567EFGH | 20120401130000 | 20120501130000 | User01 | 0123ABCD |
| MNOP3456 | 20120401140000 | 20120401150000 | 8901IJKL | 20120401140000 | 20120501140000 | User01 | 0123ABCD |
| QRST7890 | 20120401120000 | 20120401130000 | 9876ZYXW | 20120401120000 | 20120501120000 | User02 | null |
| UVWX1234 | 20120401130000 | 20120401140000 | 5432VUTS | 20120401130000 | 20120501130000 | User02 | 9876ZYXW |
| ... | ... | ... | ... | ... | ... | ... | ... |

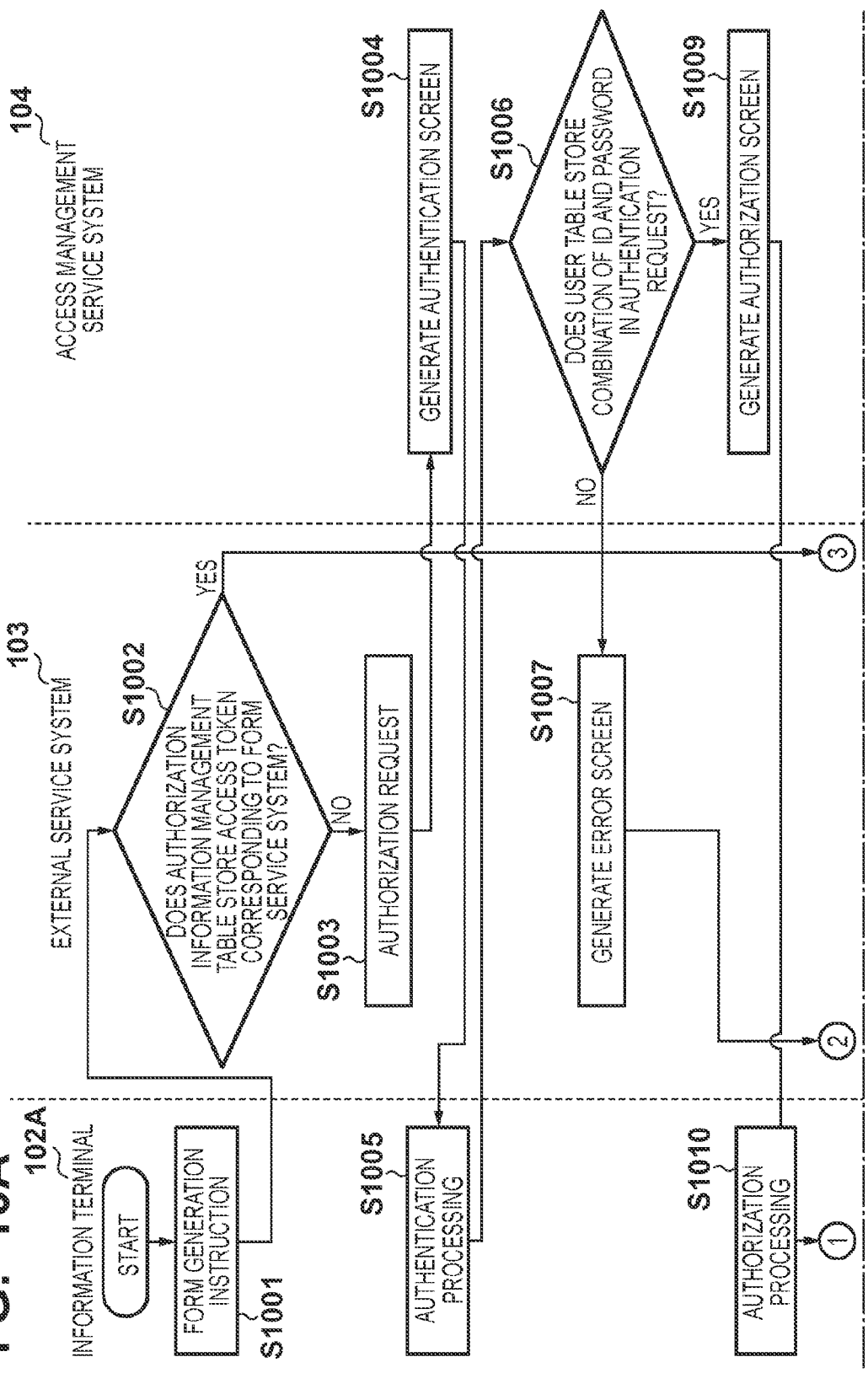

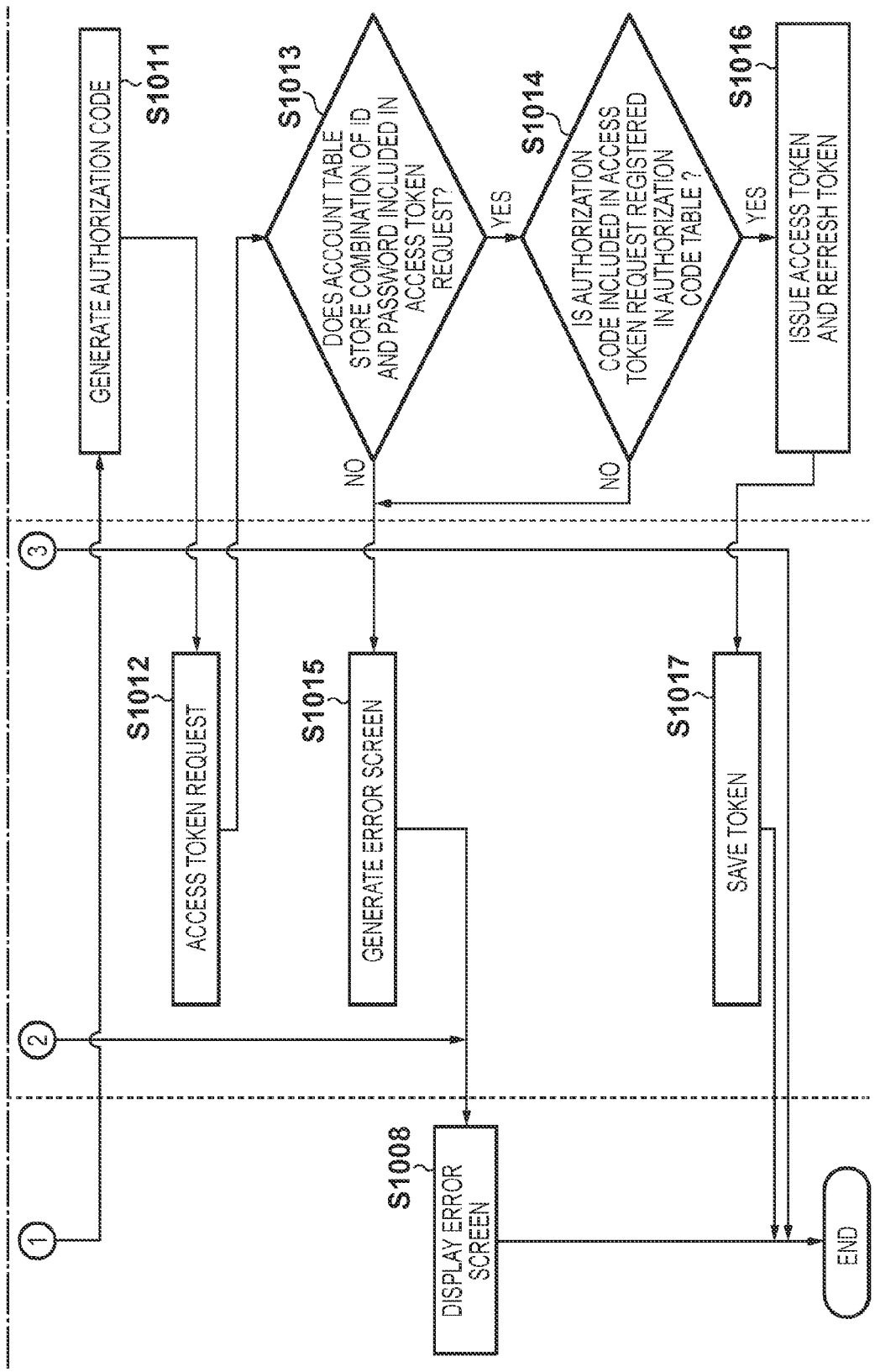

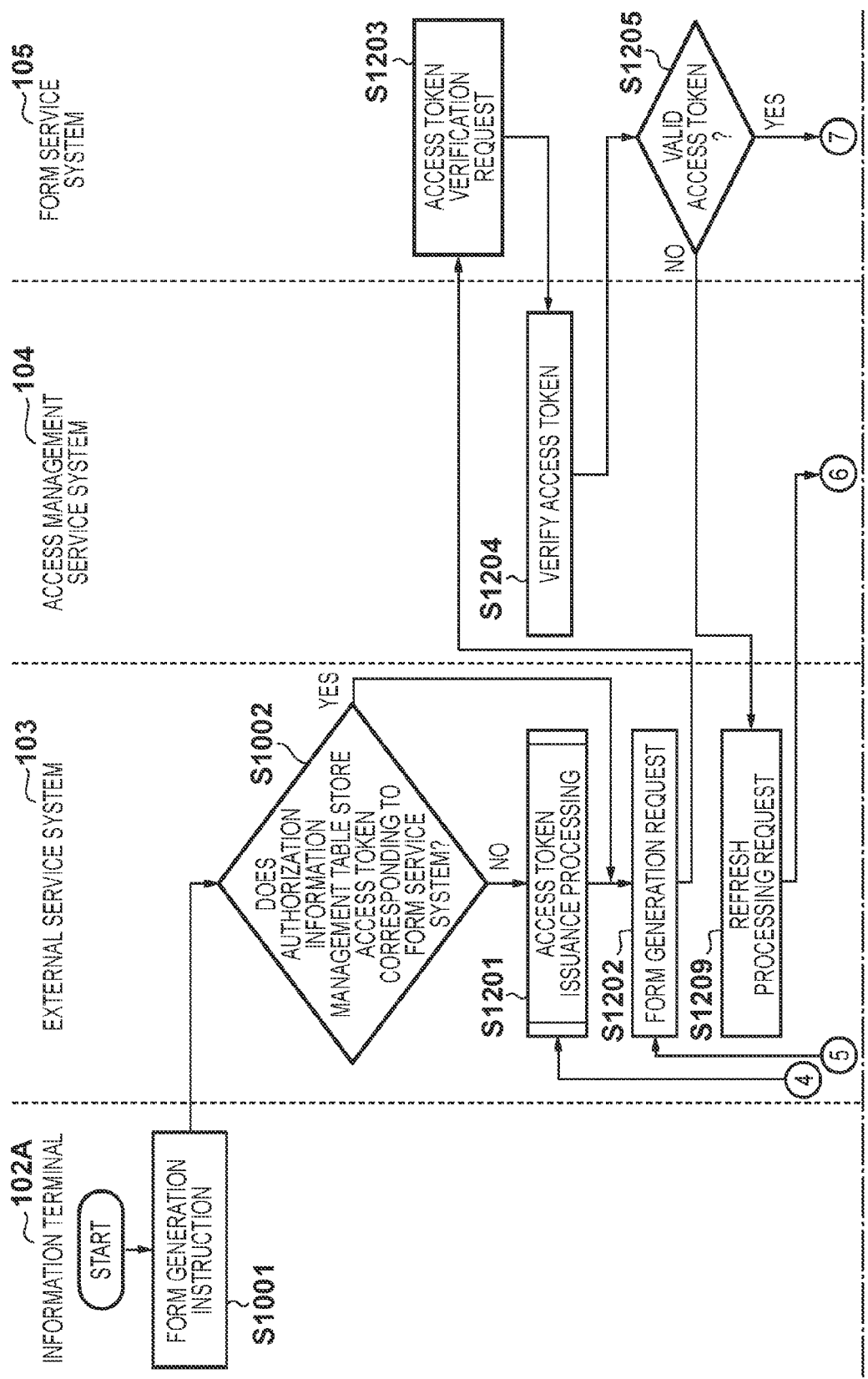

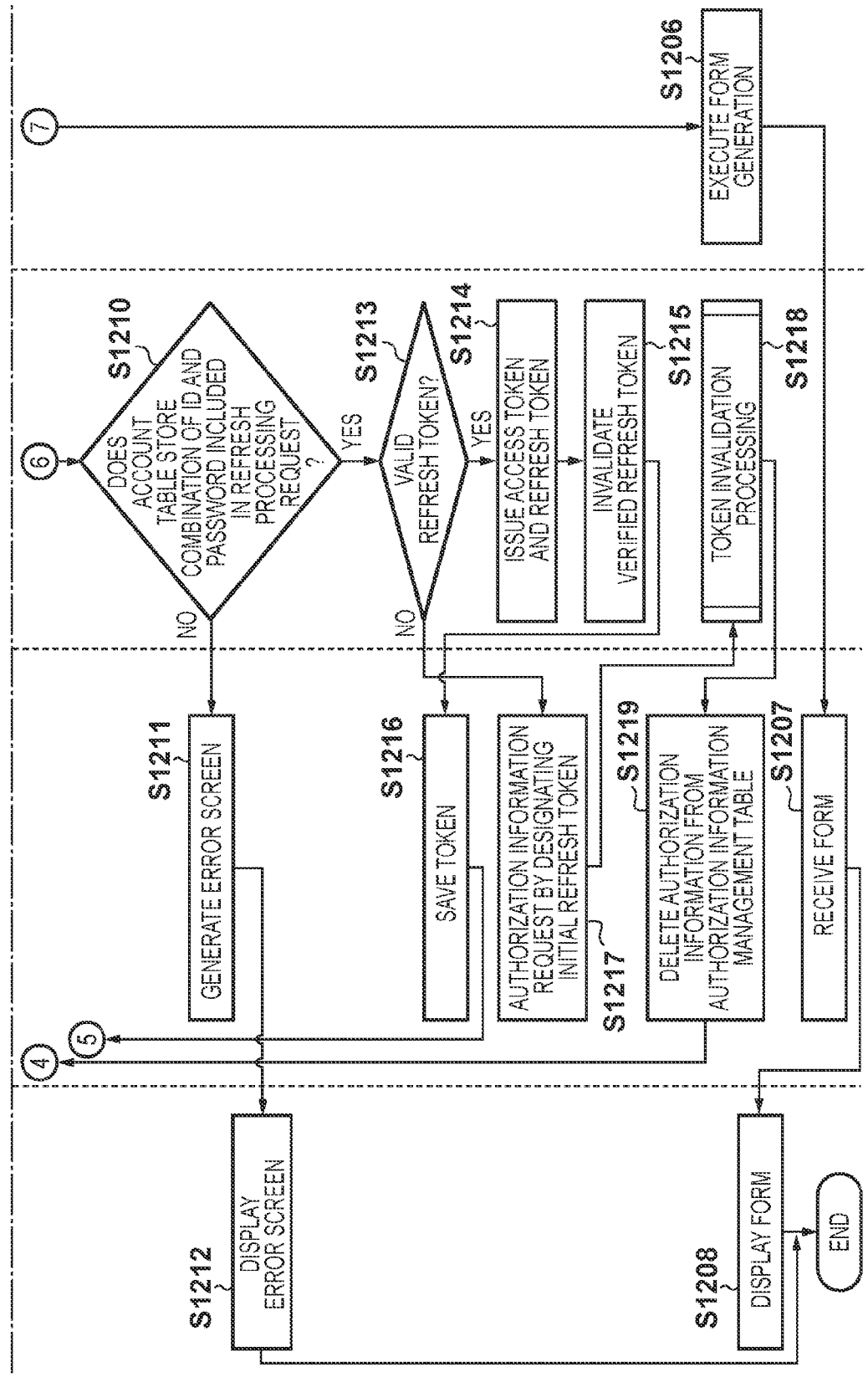

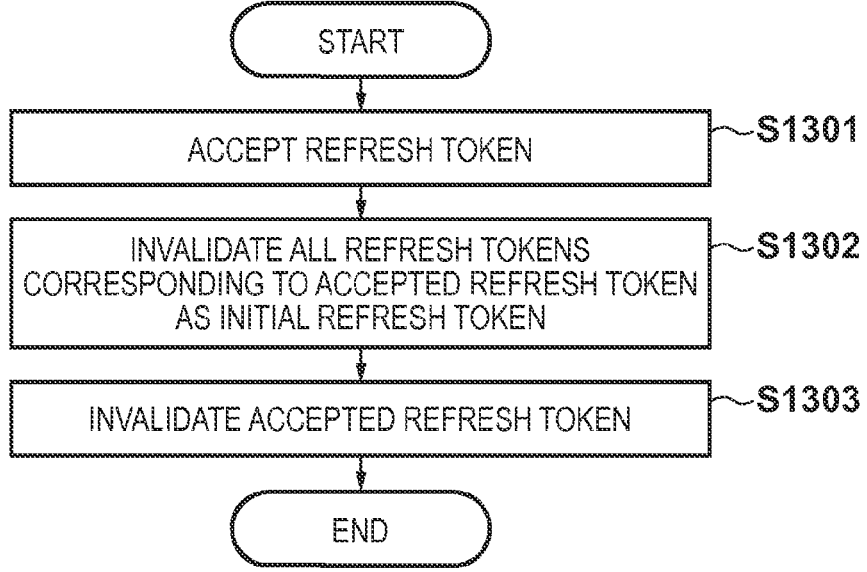
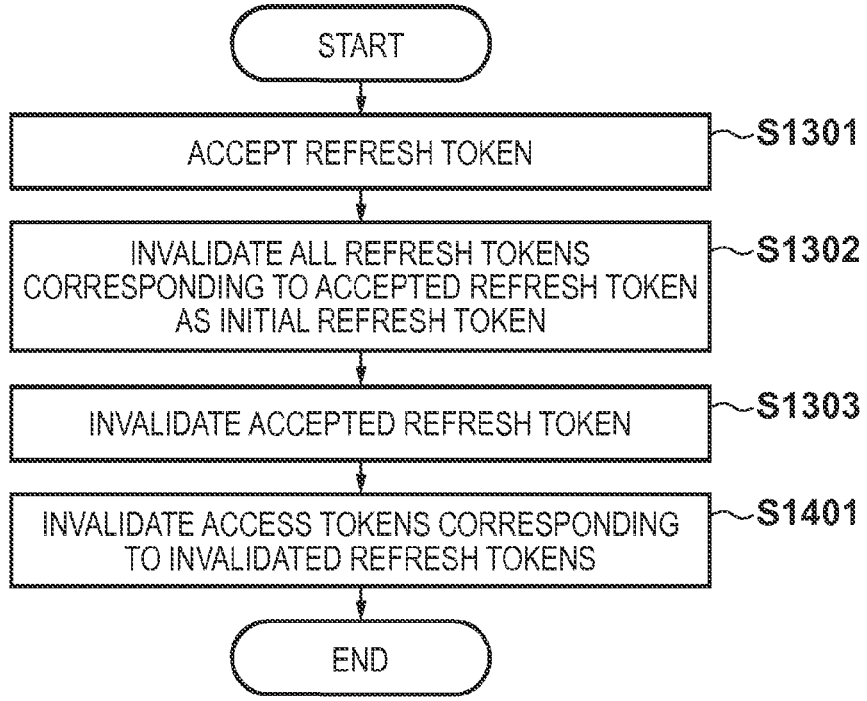

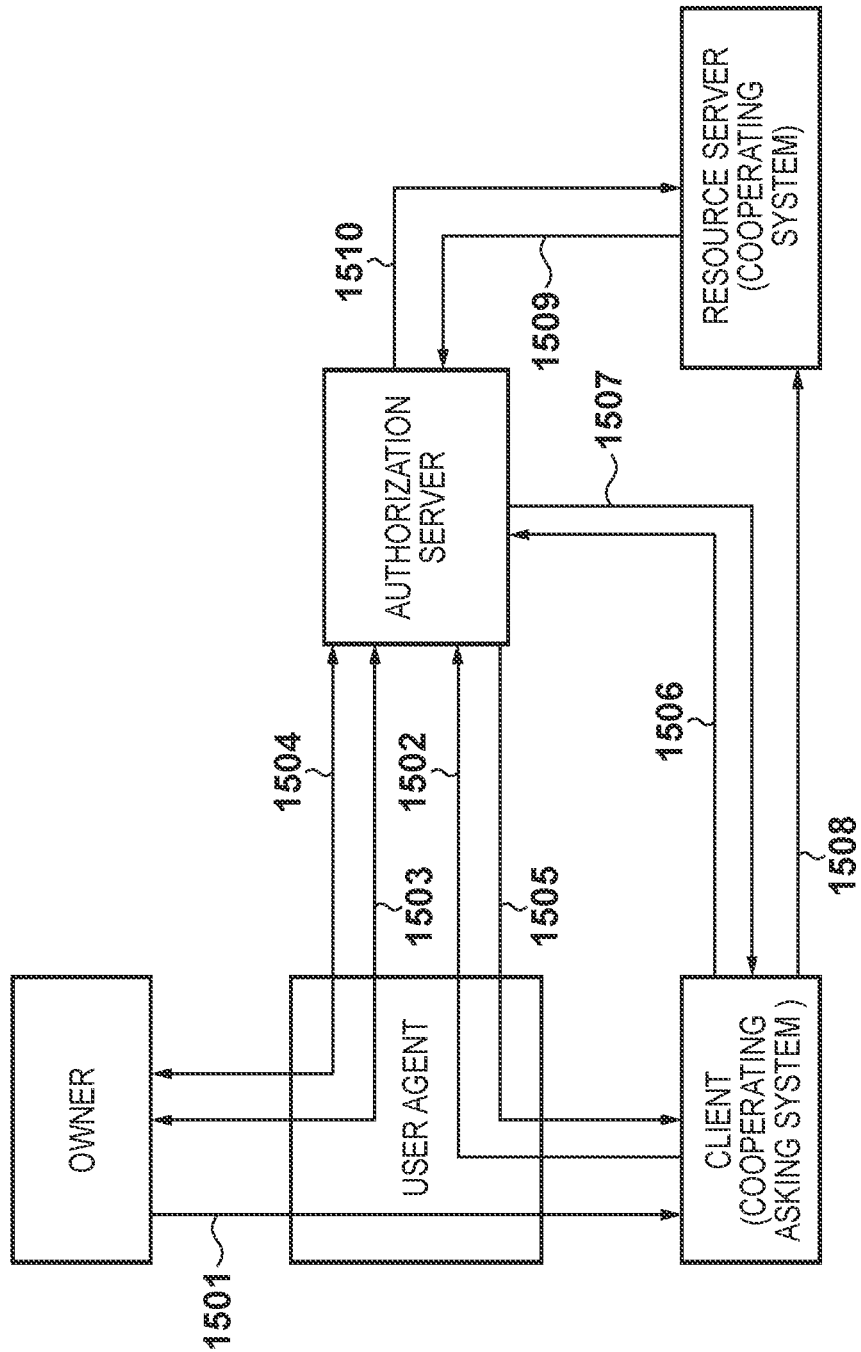

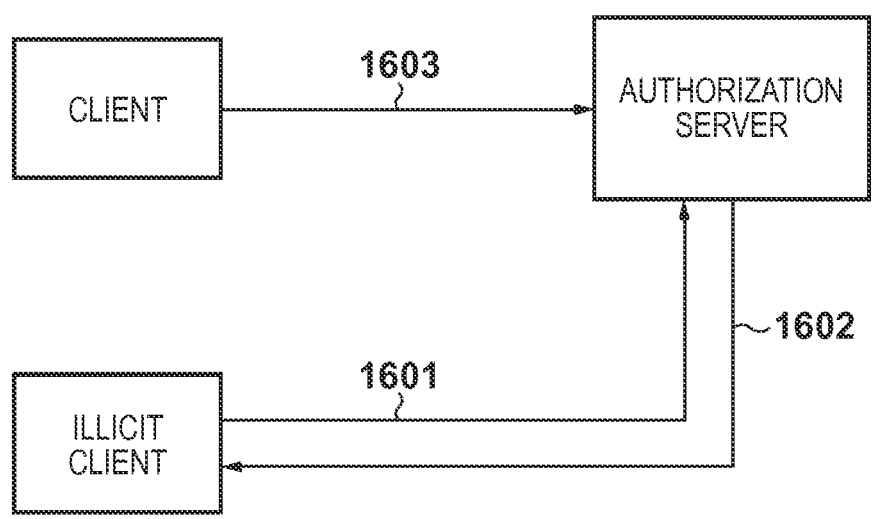
F I G. 16 ns application is a national stage application under 35
AUTHORIZATION SERVER AND CLIENT APPARATUS, SERVER COOPERATIVE SYSTEM, AND TOKEN MANAGEMENT METHOD This application is a national stage application under 35 U.S.C. §371 of International Application No. PCT/JP2013/061344, having an International filing date of Apr. 10, 2013, which claims priority to Japan 2012-120140, filed on May 25, 2012, the contents of each of which are incorporated by reference as if set forth in full herein.

TECHNICAL FIELD

The present invention relates to an authorization server and client apparatus, a server cooperative system, and a token management method, which are required to control accesses between a plurality of online service systems in, for example, an online system implemented by mashing up a plurality of online service systems.

BACKGROUND ART

In recent years, a system called a cloud service, which provides software functions via the Internet, has received a lot of attention. Recently, in increasing cases, a plurality of cloud services are cooperated to provide a new system.

A technique called "OAuth" is available as a mechanism for securely and easily implementing access control between systems which provide services upon cooperating cloud services (refer to "The OAuth 2.0 Authorization Protocol draft-ietf-oauth-v2-25", E. Hammer, Oct. 9, 2012).

OAuth is a technique for transferring an access authority of a user of a cooperating system to a cooperation asking system while limiting to the access authority. With this technique, the cooperation asking system can access the cooperating system using the authority of that user, and can provide services using those provided by the cooperating system to users. When authentication mechanisms of cooperating systems include the access authority transfer configuration of systems based on OAuth, the cooperation between systems can be securely implemented without storing authentication information associated with the security such as user IDs and passwords of the cooperating system in the cooperation asking system. OAuth sets a valid period for authorization information required to permit accesses from the cooperation asking system, and also sets a mechanism for re-issuing authorization information after the valid period of the authorization information has expired and a mechanism for invalidating the authorization information and re-issuance of the authorization information.

On the other hand, as another authorization technique different from OAuth, a method of setting a valid period for use permission is known. In this method, a method of extending the valid period of use permission in each system, and a method of permitting use again while obviating the need for verification within a given period even after the valid period has expired are conventionally known (refer to Japanese Patent Laid Open No. 2011-519087).

However, the existing OAuth configuration for re-issuing authorization information after the valid period of the authorization information has expired suffers a problem in terms of security. More specifically, when authentication information of a client and update authorization information have leaked, a malicious user may illicitly re-issue authorization information. When authentication information of a client, which is managed in a server system, is to be changed so as to cope with leakage of the authentication information of a client and the update authorization information, such change seriously influences the operation of the server system.

SUMMARY OF INVENTION

The present invention provides an authorization system which can solve the aforementioned problems. More specifically, the present invention provides an authorization server and client, a server cooperative system, and a token management method, which enhance security.

The present invention includes the following arrangement.

That is, there is provided an authorization server, which authorizes an access request from a client apparatus to a resource server based on valid authorization information received from the client apparatus in association with the request, the server comprising: issuance means for issuing authorization information used to access the resource server and update authorization information used to re-issue new authorization information without any authentication information in accordance with an issuance request received from the client apparatus together with authentication information; re-issuance means for re-issuing new update authorization information and new authorization information in accordance with a refresh processing request received together with update authorization information, and storing the update authorization information issued by the issuance means so as to re-issue new update authorization information and authorization information as initial update authorization information in association with the re-issued authorization information and update authorization information; and invalidation means for invalidating, in accordance with an invalidation request received together with update authorization information, update authorization information with which the received update authorization information is associated as initial update authorization information.

According to another aspect, the present invention includes the following arrangement. That is, there is provided a client apparatus which transmits an access request to a resource server together with authorization information issued by an authorization server to request a service by the resource server, the apparatus comprising: means for storing the authorization information issued by the authorization server, update authorization information used to re-issue new authorization information without any authentication information, and initial update authorization information issued first by the authorization server so as to re-issue the authorization information in association with each other; and invalidation request means for transmitting an invalidation request together with the stored initial update authorization information to the authorization server to request the authorization server to invalidate update authorization information associated with the initial update authorization information.

According to yet another aspect, the present invention includes the following arrangement. That is, there is provided a server cooperative system including an authorization server, which authorizes an access request from a client apparatus to a resource server based on valid authorization information received from the client apparatus in association with the request, a client apparatus, which transmits an access request to a resource server together with authorization information issued by the authorization server to request a service by the resource server, and the resource server, which provides a service to the client apparatus, the authorization server comprising: issuance means for issuing authorization information used to access the resource server and update authorization information used to re-issue new authorization information without any authentication information in accordance with an issuance request received from the client apparatus together with authentication information; re-issuance means for re-issuing new update authorization information and new authorization information in accordance with a refresh processing request received together with update authorization information, and storing the update authorization information issued by the issuance means so as to re-issue new update authorization information and authorization information as initial update authorization information in association with the re-issued authorization information and update authorization information; and invalidation means for invalidating, in accordance with an invalidation request received together with update authorization information, update authorization information with which the received update authorization information is associated as initial update authorization information, and the client apparatus comprising: means for storing the authorization information issued by the authorization server, update authorization information used to re-issue new authorization information without any authentication information, and initial update authorization information issued first by the authorization server so as to re-issue the authorization information in association with each other; and invalidation request means for transmitting an invalidation request together with the stored initial update authorization information to the authorization server to request the authorization server to invalidate update authorization information associated with the initial update authorization information.

According to yet another aspect, the present invention includes the following arrangement. That is, there is provided a token management method in a server cooperative system including an authorization server, which authorizes an access request from a client apparatus to a resource server based on valid authorization information received from the client apparatus in association with the request, a client apparatus, which transmits an access request to a resource server together with authorization information issued by the authorization server to request a service by the resource server, and the resource server, which provides a service to the client apparatus, the method comprising: an issuance step of issuing, by the authorization server, authorization information used to access the resource server and update authorization information used to re-issue new authorization information without any authentication information in accordance with an issuance request received from the client apparatus together with authentication information; a step of storing, by the client apparatus, the authorization information issued by the authorization server, update authorization information used to re-issue new authorization information without any authentication information, and initial update authorization information issued first by the authorization server so as to re-issue the authorization information in association with each other; and a step of transmitting, when a response indicating that the authorization information is invalid is received in response to the access request, a refresh processing request to the authorization server together with update authorization information associated with the authorization information corresponding to the response indicating that the authorization information is invalid, by the client apparatus; a re-issuance step of re-issuing, by the authorization server, new update authorization information and new authorization information in accordance with a refresh processing request received together with update authorization information, and storing the update authorization information issued in the issuance step so as to re-issue new update authorization information and authorization information as initial update authorization information in association with the re-issued authorization information and update authorization information; an invalidation request step of transmitting, by the client apparatus, an invalidation request together with the stored initial update authorization information to the authorization server to request the authorization server to invalidate update authorization information associated with the initial update authorization information; and an invalidation step of invalidating, in accordance with an invalidation request received together with update authorization information, update authorization information with which the received update authorization information is associated as initial update authorization information by the authorization server.

According to the present invention, even when authentication information of a client and update authorization information have leaked, authentication information can be prevented from being illicitly re-issued.

Also, according to the present invention, since authentication information of a client need not be changed, leakage of update authorization information can be coped with within a narrow influence range without stopping a system of the client.

Further features of the present invention will become apparent from the following description of exemplary embodiments with reference to the attached drawings.

BRIEF DESCRIPTION OF DRAWINGS

FIGS. 6A, 6B, and 6C are tables showing data structures held by an external service system 103;
FIGS. 7A and 7B are account tables held by an access management service system 104;
FIG. 8 is a table showing the data structure of an authorization code held by the access management service system 104;
FIG. 9 is a table showing the data structure of authorization information held by the access management service system 104;
FIGS. 10A and 10B are flowcharts of access token issuance processing;
FIGS. 12A and 12B are flowcharts of authorization processing controlled by the present invention;
FIG. 13 is a flowchart of authorization information invalidation processing according to the first embodiment;
FIG. 14 is a flowchart of authorization information invalidation processing according to the second embodiment;
FIG. 15 is a block diagram showing an access authority transfer sequence of OAuth;
FIG. 16 is a block diagram showing problem 1 of OAuth.

DESCRIPTION OF EMBODIMENTS

Figure 1:
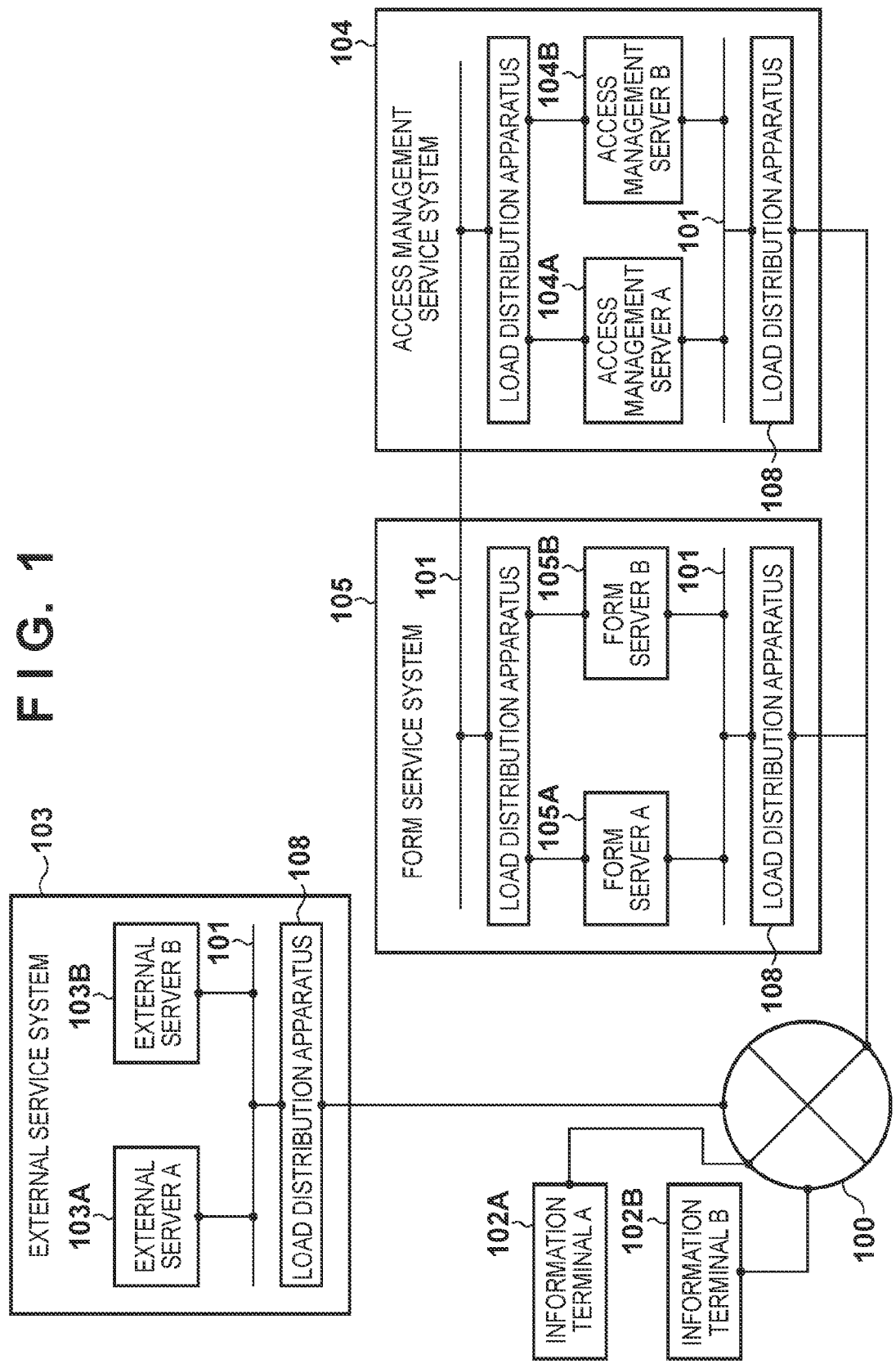
FIG. 1 is a block diagram of an overall system.

Some practical examples of problems of the present invention will be introduced below. Upon transferring an access authority by OAuth, a cooperating system performs authority confirmation of a cooperation asking system and that of a user who uses the cooperation asking system. The cooperation asking system is a system which is directly accessed by the user to request a service. The cooperating system is a system which provides services and the like (including resources) to the cooperation asking system in cooperation with the cooperation asking system. In the following description, according to the definitions of OAuth, the cooperation asking system will be referred to as a client, the cooperating system will be referred to as a resource server, and a server which manages authentication information and authorization information of the resource server will be referred to as an authorization server. Note that the authentication information managed by the authorization server includes security information required to authenticate users and systems which use the resource server. For example, the authentication information includes user IDs and passwords. The authorization information managed by the authorization server includes information which is issued by the authorization server according to the OAuth authority transfer sequence, and is required to permit accesses to the resource server. In OAuth, the authorization information is called an access token. Upon accessing the resource server, the client transmits an access token to the resource server. The resource server requests the authorization server to confirm the received access token, and determines whether or not to permit an access. Thus, the client can use the resource server without knowing authentication information managed by the authorization server.

The OAuth authority transfer sequence will be described below with reference to FIG. 15. Note that a user who uses the cooperation asking system will be referred to as a resource owner (or simply referred to as an owner) hereinafter, and a Web browser included in an information processing terminal operated by the user will be referred to as a user agent hereinafter.

In processing step 1501, an owner operates the client via the user agent. In this state, the client starts the OAuth sequence so as to use the resource server. In processing step 1502, the client redirects the user agent to the authorization server. In this case, the client sends a client ID used to uniquely identify the client itself and a redirect URL to the authorization server.

In processing step 1503, the authorization server authenticates the owner via the user agent. The owner authentication is implemented by, for example, a method of displaying an authentication screen on the user agent, and prompting the owner to input a user ID and password managed by the authorization server. If the owner authentication has succeeded, the authorization server determines whether or not the authenticated owner has an appropriate access authority to the resource server.

In processing step 1504, the authorization server performs authorization confirmation of an access to the resource server by the client for the owner who is determined to have the access authority via the user agent. The authorization confirmation for the owner is implemented by, for example, a method of displaying an authorization confirmation screen, and prompting the owner to press an authorization button. When the owner authorizes, the authorization server generates an authorization code. The authorization code is information indicating that the owner permits the client to access the resource server.

In processing step 1505, the authorization server sends the generated authorization code to the redirect URL passed from the client in processing step 1502. In processing step 1506, the client requests the authorization server to send authorization information required to use the resource server. In this case, the client sends the received authorization code and authentication information of the client. The authentication information of the client includes, for example, a client ID and password. The authorization server confirms the received authorization code and authenticates the client. If the client authentication has succeeded, the authorization server confirms whether or not the resource server permits the client to cooperate. If it is confirmed that the authorization code is valid, and the resource server permits the client to cooperate, the authorization server generates authorization information for the resource server.

In processing step 1507, the authorization server sends the generated authorization information to the client.

In processing step 1508, the client sends the authorization information to the resource server, thereby issuing a use request of the resource server.

In processing step 1509, the resource server sends the received authorization information to the authorization server so as to determine access permission. The authorization confirms the received authorization information.

In processing step 1510, the authorization server returns the confirmation result of the authorization information to the resource server. The resource server judges according to the confirmation result of the authorization information whether or not to grant access permission to the client.

In OAuth, whether or not to permit an access to the resource server is judged by confirming only the access token in the authorization server like processing steps 1509 and 1510. For this reason, when an access token is leaked to a system other than the authentic client, an unintended client spoofs the authentic client which issued the access token, and can use the resource server. Due to such a problem, OAuth recommends setting a short valid period of the access token for the sake of security. On the other hand, when the valid period of the access token is short, authorization confirmation for the owner in processing step 1504 is generated every access even in the system authorized once by the owner, resulting in inconvenience. For this reason, OAuth provides a method of issuing update authorization information which authorizes updating of an access token together with the access token at the access token issuance timing in processing step 1506. This update authorization information will be referred to as a refresh token hereinafter. The refresh token is information required to issue an access token without any authorization confirmation for the owner. The authorization server issues a new access token which has an authority which is the same as or narrower than that of the access token issued together with the refresh token.

Upon issuing the new access token using the refresh token, the client sends the refresh token and authentication information of the client to the authorization server. The authentication information of the client includes, for example, a client ID and password. The authorization server confirms the refresh token, and authenticates the client. If the client authentication has succeeded, the authorization server confirms whether or not the resource server permits the client to cooperate. If it is confirmed that the refresh token is valid and the resource server permits the client to cooperate, the authorization issues a new access token and refresh token. In this case, the authorization server invalidates the used refresh token. Processing for re-issuing an access token using a refresh token will be referred to as refresh processing hereinafter. Note that re-issuance of a token will often be referred to as updating or refreshing of a token, but they are synonymous in this embodiment.

In this case, when the refresh token and authentication information of the client have leaked, an illicit client can spoof an authentic client to execute refresh processing. The illicit client which executed the refresh processing can spoof the authentic client to use the resource server using an issued access token. The illicit client can also spoof the authentic client to continuously use the resource server using a new refresh token issued by the refresh processing. Furthermore, by only providing an access token issued by the illicit client, various clients can illicitly use the resource server.

There are two methods to cope with leakage of the refresh token and authentication information of the client within the range publicized by OAuth. In one method, a refresh token is designated, and the designated refresh token and an access token to be paired with that refresh token are respectively invalidated. With this method, since the refresh token is invalidated, the refresh processing can be prevented.

However, this method suffers a problem. The problem of this method will be described below with reference to FIG. 16. In processing step 1601, an illicit client requests the authorization server to execute refresh processing. Assume that the illicit client is a system which possesses authentication information and a refresh token leaked from the client. Since the illicit client uses the authentication information of the authentic client, client authentication at the authorization server succeeds. Furthermore, since the refresh token is authentic, refresh token confirmation at the authorization server also succeeds. Thus, the authorization server executes refresh processing, and issues a new access token and refresh token. After that, the authorization server invalidates the refresh token used in the refresh processing. In processing step 1602, the authorization server passes the issued access token and refresh token to the illicit client.

In this state, in processing step 1603, the client requests to invalidate the refresh token and access token. However, the refresh token possessed by the client has already been invalidated by the refresh processing in processing step 1601. Also, the client cannot know the refresh token issued by the refresh processing in processing step 1601. For this reason, if the illicit client executes the refresh processing even once, the client cannot invalidate the subsequent refresh processing.

In the second method, authentication information of an authentic client is updated. For example, when a password of the client is changed at the authorization server, refresh processing by an illicit client which knows only authentication information before change can be prevented. According to this method, even when the illicit client executes the refresh processing, the refresh processing can be prevented.

Figure 17:
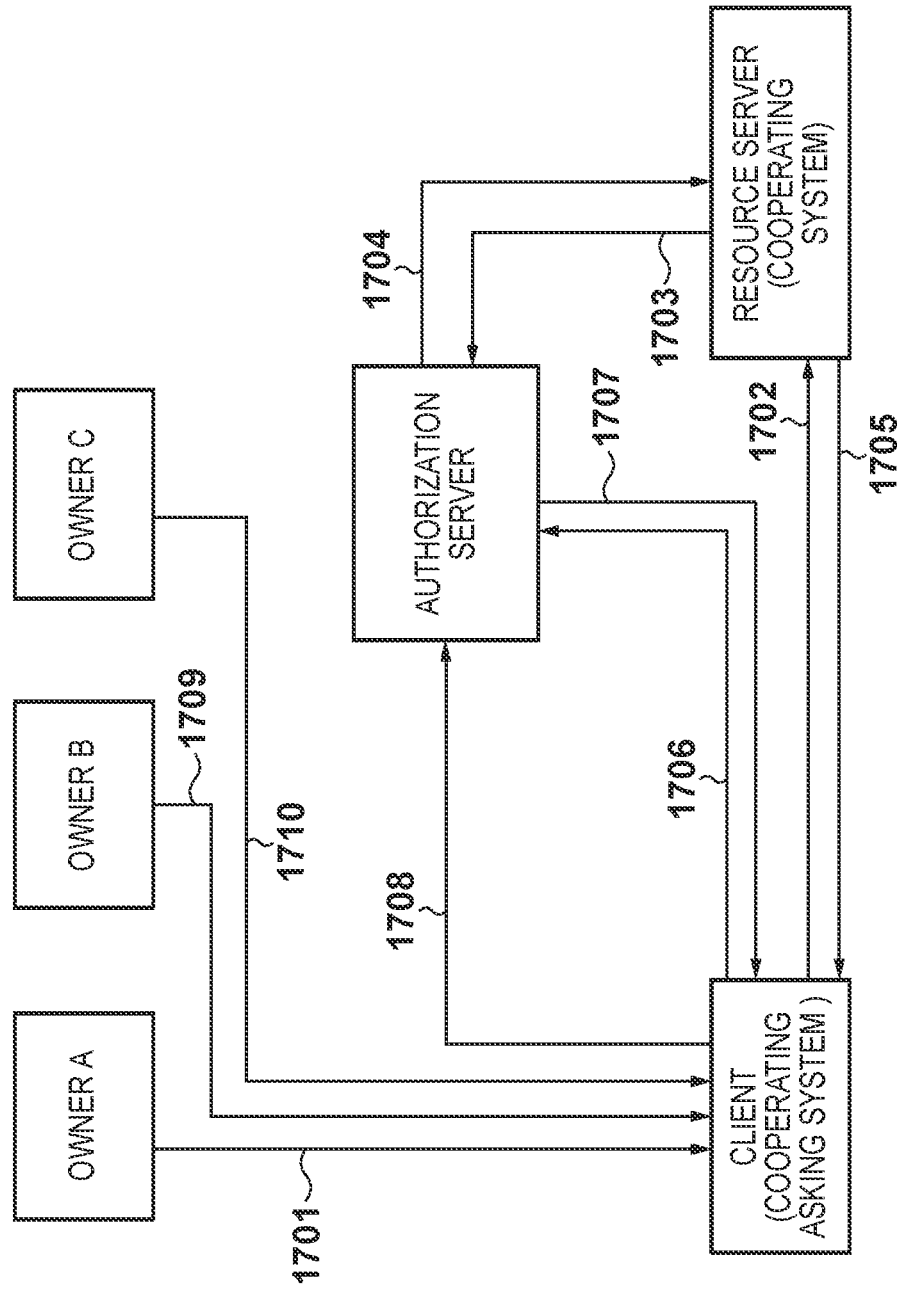
FIG. 17 is a block diagram showing problem 2 of OAuth.

However, this method suffers a problem of a broad influence range. The problem of this method will be described below with reference to FIG. 17. Assume that an owner A uses a client in processing step 1701, and the client requests an access to the resource server using a previously issued access token in processing step 1702. In processing step 1703, the resource server sends the access token to the authorization server so as to determine whether or not to permit the access. Assume that the access token is invalid. For this reason, the authorization server returns an invalid access token message to the resource server in processing step 1704. Since the access token is invalid, the resource server denies the access. In processing step 1705, the resource server returns an invalid access token message to the client, and denies the access.

In processing step 1706, since the access token is invalid, the client attempts to re-issue an access token using a refresh token. The client sends the refresh token and authentication information of the client to the authorization server, and requests it to execute refresh processing. Assume that the refresh token is invalid. When the refresh token is invalid, it has already been invalidated since the refresh processing was executed, or it is invalid since a valid period of the refresh token has expired. The authorization server returns a refresh token invalid message to the client in processing step 1707.

Upon reception of the refresh token invalid message, the client detects a possibility of illicit execution of refresh processing. For this reason, in processing step 1708, the client requests the authorization server to change its authentication information. A change of the authentication information is, for example, that of a password. Upon reception of the authentication information change request of the client, the authorization server updates the client authentication information managed by itself. After that, the authorization server sends a client authentication information change end notification to the client in processing step 1709.

Note that the client authentication at the authorization server is executed at an access token issuance timing and an execution timing of refresh processing. For this reason, in order to change the password, these processes have to be stopped. That is, these processes at the client are stopped between processing steps 1708 and 1709. In this case, OAuth is a use model of one client by a plurality of owners. For example, parallel to client use in processing step 1701, processing step 1710 of a client use request from owner B and processing step 1711 of a client use request from owner C are executed. For this reason, even when the refresh token issued by authorization of owner A is invalid, access token issuance processing and refresh processing in response to requests from owners B and C are also stopped between processing steps 1708 and 1709. That is, if the client is stopped, this influences all the owners who use the client.

The present invention can solve such problems, and provides a mechanism which prevents an access token from being re-issued within a narrow influence range and prevents an illicit use of a system when authentication information of a client and a refresh token have leaked.

The best mode of carrying out the present invention will be described hereinafter with reference to the drawings.

First Embodiment

On the Internet, various service providers provide various online services. Such online services include a standalone online service managed by a single service provider and also a method of implementing one solution by combining a plurality of online services managed by a plurality of service providers. The latter solution is called "mashup", and seems like one Web site or Web service on the surface. However, at an actual backend, a plurality of online services are made to cooperate and linked to combine required functions, thereby implementing the solution. Note that an online service in this case is a function group provided by a Web site, Web application, Web service, and the like. The Web site, Web application, Web service, and the like are software programs executed by a server computer. A system configured by "mashup" will also be referred to as a server cooperative system or simply as a cooperative system in this embodiment.

<Arrangement Example of Online Service System>

FIG. 1 shows the network arrangement including various online services. The Internet 100 is a public network such as the Internet, which can be externally connected. An intranet 101 is a private network such as a LAN, which cannot be externally connected. An information terminal 102 includes a personal computer, mobile terminal, and the like, and is used when online services are used via the Internet 100. This example shows two terminals 102A and 102B. However, since either of these terminals may be used, they will be described as an information terminal 102 unless otherwise discriminated. In OAuth, a user who operates the information terminal 102 is called an owner, and a Web browser included in the information terminal 102 is called a user agent. An external service system 103 is an online service system which mashes up a form service system 105 (to be described later) online. This system is called a client in OAuth. Note that in this embodiment, this system is often called a client apparatus to clarify that the client is an apparatus. The external service system 103 includes one or a plurality of external servers, and is configured to distribute and process requests from the Internet 100 by a load distribution apparatus 108. Note that the external service system 103 includes two external servers 103A and 103B in FIG. 1, but it includes one or a plurality of external servers in practice.

An access management service system 104 is a service system which manages authentication information of a user and authorization information. In OAuth, this system is called an authorization server. The access management service system 104 includes one or a plurality of access management servers, and is configured to distribute and process requests from the Internet 100 and intranet 101 by a load distribution apparatus 108. Note that the access management service system 104 includes two access management servers 104A and 104B in FIG. 1, but it includes one or a plurality of access management servers in practice.

The form service system 105 is an online service system which generates a form in accordance with a request from the information terminal 102 or external service system 103 via the Internet 100. In OAuth, this system is called a resource server. The form service system 105 includes one or a plurality of form servers, and is configured to distribute and process requests from the Internet 100 by a load distribution apparatus 108. Also, the form service system 105 can distribute and process requests via the intranet 101 by another load distribution apparatus 108. Note that the form service system 105 includes two form servers 105A and 105B in FIG. 1, but it includes one or a plurality of form servers in practice. In this example, the form service system is exemplified as the resource server, and any other servers are applicable as long as they provide services via webs.

<Hardware Arrangement of Server Computer>

Figure 2:
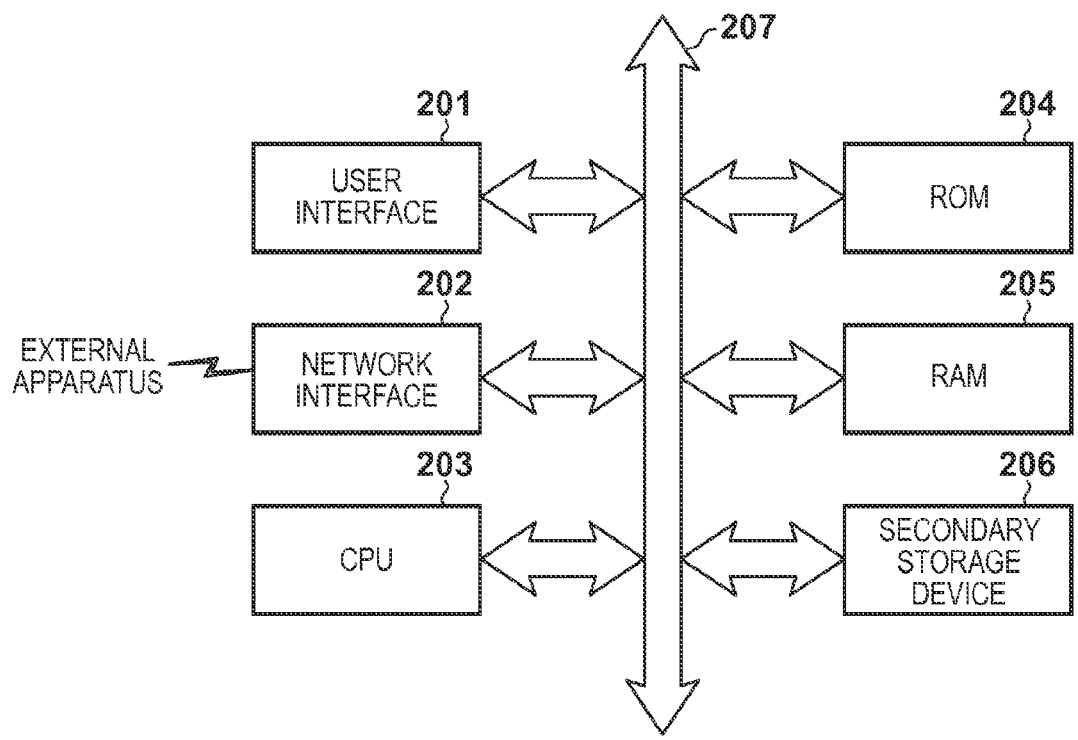
FIG. 2 is a block diagram showing the hardware arrangement of a server.

FIG. 2 shows the logical arrangement of an information processing function of a server computer which executes software programs such as a Web site, Web application, and Web service that configure various servers shown in FIG. 1.

A user interface 201 is hardware required to input/output information by means of a display, keyboard, mouse, and the like. A computer which does not include these hardware components can be connected and operated from another computer by remote desktop or the like. A network interface 202 is hardware which connects a network such as a LAN to communicate with another computer and network device. A CPU 203 executes programs loaded from a ROM 204, RAM 205, secondary storage device 206, and the like, and implements various services. The ROM 204 is a storage device which records embedded programs and data. The RAM 205 is a temporary memory area. The secondary storage device 206 is an external storage device represented by an HDD. The respective units are connected via an input/output interface 207.

<Functional Arrangement of External Server>

Figure 3:
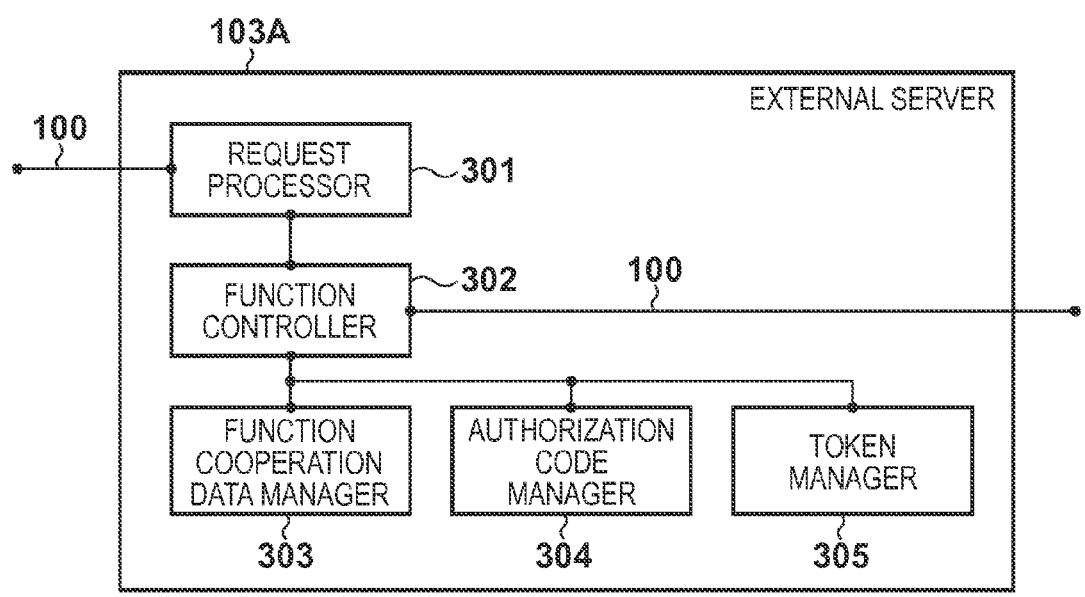
FIG. 3 is a block diagram showing the software configuration of an external server.

FIG. 3 is a block diagram showing the internal structure of the external server 103A. A request processor 301 processes a function request which is received by the external service system 103 via the Internet 100. A function controller 302 receives the request from the request processor 301, executes required processing, and returns response data to the call source. A function cooperation data manager 303 manages data required to generate a request to a system with which the external service system 103 cooperates. An authorization code manager 304 manages authorization code data. A token manager 305 manages authorization information data. The external server 103B can provide functions different from those of the external server 103A. However, in this example, the external server 103B has the same arrangement as that of the external server 103A, and provides the same functions to distribute loads. Functions to be provided by the external server 103A include, for example, a network print service. For example, the external server 103A receives, as a client, a print request of form data together with designations of a location and name of form data to be printed from a Web browser as a user agent. In response to this request, the external server 103A accesses the form service system 105 to acquire form data requested by the user. Then, the external server 103A converts the form data into print data after being merged with designated data according to the request, and transmits the print data to a printing apparatus or print server on a designated network to control it to print the print data. Of course, this is an example, and the service provided by the external service system 103 is not limited to the print service.

<Functional Arrangement of Access Management Server>

Figure 4:
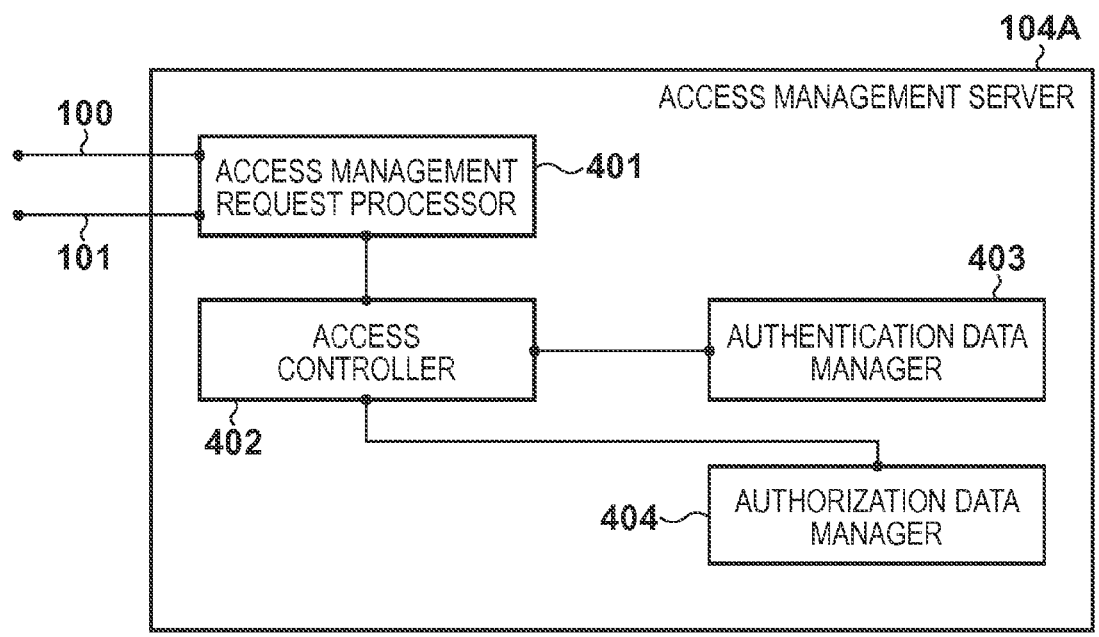
FIG. 4 is a block diagram showing the software configuration of an access management server.

FIG. 4 is a block diagram showing the internal structure of the access management server 104A. The same applies to the access management server 104B. An access management request processor 401 is a processor which processes authentication and authorization requests received by the access management service system 104 via the Internet 100 and intranet 101. Also, the access management request processor 401 returns response data returned from an access controller 402 to a call source. The access controller 402 generates response data to the authentication and authorization requests based on data acquired from an authentication data manager 403 and authorization data manager 404, and returns the response data to the access management request processor 401. The authentication data manager 403 manages user account data. More specifically, each user account includes, for example, a set of an ID and password unique to each user. Note that a set of an ID and password is also called a credential. The authorization data manager 404 manages authorization information data. The authorization data manager 404 also manages update authorization information data in addition to the authorization information. The authorization data manager 404 stores not only the latest authorization information and update authorization information but also stores an association between update authorization information which was issued first for a certain user, and the latest update authorization information for that user, as will be described later.

<Functional Arrangement of Form Server 105>

Figure 5:
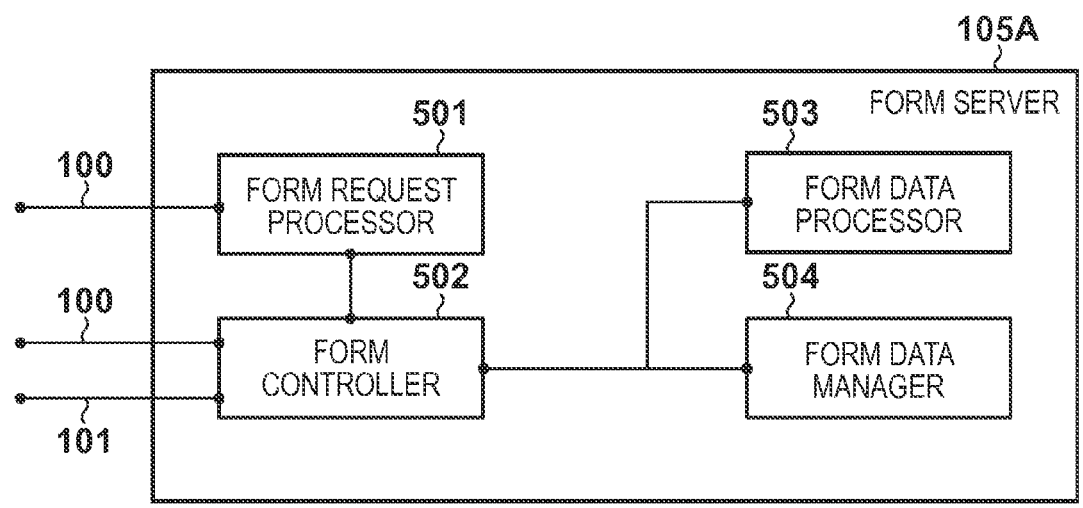
FIG. 5 is a block diagram showing the software configuration of a form server.

FIG. 5 is a block diagram showing the internal structure of the form server 105A. The same applies to the form server 105B. A form request processor 501 receives a form data generation request and form data acquisition request via the Internet 100. A form controller 502 executes required processing according to the requests received by the form request processor 501, and returns response data to a call source. The form controller 502 transmits an authentication request to the access management service system 104 via the intranet 101, and receives an authentication result. Also, the form controller 502 transmits an authorization confirmation request to the access management service system 104, and receives an authorization confirmation result. A form data processor 503 receives the form data generation request from the form controller 502, and generates form data. Also, the form data processor 503 returns the generated form data to the form controller 502 as a response. A form data manager 504 registers and manages form format data and form data used in form data generation processing by the form data processor 503. Also, the form data manager 504 receives the form data acquisition request from the form controller 502, and returns form data as a response.

<Information Managed by External Service System>

FIGS. 6A to 6C show the data structures of authorization information and an authorization code which are held by the external service system 103, and authentication information of the external service system in a table format. Authorization information and those related to authorization are managed using an authorization information management table 600 and authorization code table 610, and authentication information of the external service system is managed using a client credential table 620.

The authorization information management table 600 includes a cooperating system name 601 indicating a cooperation target system name, an access token ID 602 indicating authorization information, a refresh token ID 603 indicating update authorization information, and an initial refresh token ID 604. The access token ID 603 saves an access token issued by the access management server. The refresh token ID 603 saves a refresh token issued by the access management server. The initial refresh token ID 604 saves a first refresh token issued by the access management server at the time of first authorization processing. Upon execution of the refresh processing, the contents of the access token ID 602 and refresh token ID 603 are respectively updated by authorization information and update authorization information, which are re-issued. However, the initial refresh token ID 604 successively stores the update authorization information used in the first refresh processing. Note that these field names include "token ID", but these fields store tokens themselves in place of token IDs.

The authorization code table 610 includes a cooperating system name 611 indicating a cooperation target system name, and an authorization code ID 612 used to uniquely identify an authorization code generated by the access management service system 104.

The authentication information table 620 includes a cooperating system name 621 indicating a cooperation target system name, and a client ID 622 and password 623 which are required to authenticate the external service system 103 with respect to the cooperation target system. Details of processing of data stored in the respective data structures shown in FIGS. 6A to 6C will be described later. Note that one record of the authorization information management table 600 managed by the external server system 103 will also be referred to as client authorization related information in this embodiment.

<Information Managed by Access Management Service System>

FIGS. 7A and 7B, FIG. 8, and FIG. 9 show various kinds of information which are held by the access management service system 104 and are associated with authorization and authentication. FIGS. 7A and 7B show the data structures of user information and system information held by the access management service system 104 in a table format. The user information is managed using a user table 700, and the system information is managed using a client table 710.

Note that the user information to be managed is that of each user of a system (resource server in OAuth) managed by the access management service 104. In this embodiment, as an example of the system to be managed, users of the form service system 105 are registered.

Also, the system information to be managed is authentication information used in client authentication, which is executed by an authorization server (corresponding to the access management service system of this example) at the time of issuance and refresh processes of an access token. In this embodiment, the system information includes a client ID and password required to identify the external service system 103 as a client.

The user table 700 includes user information including a user ID 701 and password 702. The client table 710 includes system information including a client ID 711 indicating an ID of the client and a password 712. Details of processing of data stored in the respective data structures shown in FIGS. 7A and 7B will be described later.

Figure 8:
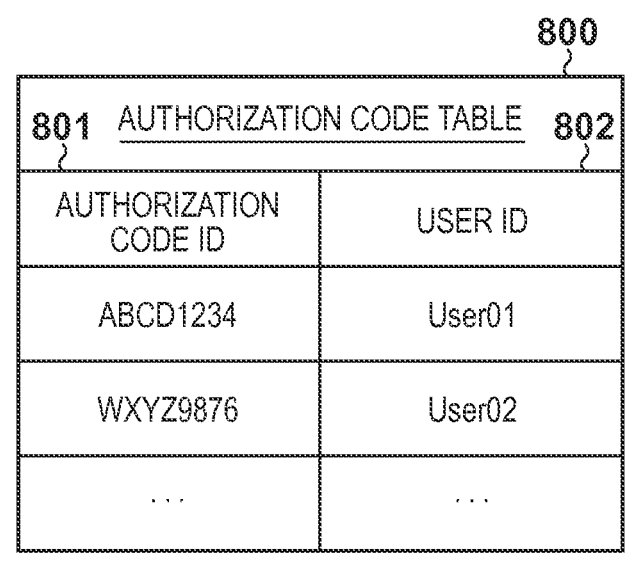

FIG. 8 shows the data structure of an authorization code held by the access management service system 104 in a table format. The authorization code is managed using an authorization code table 800.

The authorization code table 800 includes an authorization code ID 801 indicating a value used to uniquely identify an authorization code, and a user ID 802 used to uniquely identify a user who executes authorization. The authorization code indicates permission of an access to the resource server by an owner having an access authority of the resource server, that is, permission of an access to the form service system 105 by a user having an access authority to the form service system 105 in this example. That is, based on the authorization code, the access authority to the resource server is transferred from the owner to the client. Details of processing of the data stored in the data structure shown in FIG. 8 will be described later.

(Authorization Information)

FIG. 9 shows the data structure of authorization information held by the access management service system 104 in a table format. The authorization information is managed using an authorization information management table 900. Note that the authorization information corresponds to an access token, and update authorization information corresponds to a refresh token. Also, in FIG. 9, a set of information in fields 901 to 908 will also be referred to as authorization related information in this embodiment.

The authorization information management table 900 has an access token ID 901 as authorization information, access token issuance date and time 902, and access token valid date and time (that is, a valid period) 903 for each access authority. Also, the authorization information management table 900 has a refresh token ID 904 as update authorization information, refresh token issuance date and time 905, and refresh token valid date and time 906. Furthermore, the authorization information management table 900 has a user ID 907 of a user who is permitted to access the resource server (that is, the form service system) by the access token, and an initial refresh token ID 908 for each access authority. The initial refresh token ID 908 saves a refresh token ID issued together with a first access token in association with that access authority.

Note that when the access management service system 104 executes refresh processing of an access token, both an access token and refresh token are re-issued. The re-issued access token is also related to one access authority which is the same as that of the source access token. However, when authorization related information of the re-issued access token and the like is to be distinguished from that of the source access token and the like, new and "previous" are to be attached to them. That is, when refresh processing is executed using a refresh token, a new access token and new refresh token are re-issued. An access token and refresh token before re-issuance will be respectively referred to as a previous access token and previous refresh token. Also, a first access token and refresh token related to one access authority will be respectively referred to as an initial access token and initial refresh token. An access token and refresh token re-issued by refresh processing are saved in the authorization information management table 900 together with their issuance dates and times and valid dates and times. The valid date and time can be obtained by adding a predetermined period to the issuance date and time. The user ID 907 saves a user ID stored in association with a refresh token used for the refresh processing, and the initial refresh token ID 908 saves a value of an initial refresh token stored in association with the used refresh token. However, when the value of the initial refresh token saved in association with the used refresh token is "null", the value of the refresh token used for the refresh processing is the initial refresh token, and that value is saved as the initial refresh token ID 908 of the corresponding access authority. Of course, the initial refresh token may be saved in place of null. When both of the valid date and time of an access token and the valid date and time of a refresh token before refresh processing have expired, a set of information related to that access authority is not required anymore, and can be deleted from the authorization information management table 900. When the valid date and time of a previous access token before refresh processing does not expire, since that previous access token is likely to be used, authorization related information corresponding to that previous access token is left without being deleted. Upon accessing the authorization information management table 900, whether or not the valid date and time of each token have expired is determined, and when the valid date and time has expired, the corresponding token may be deleted. At the time of authentication of an access authority or refresh processing of a token, since the access authority or refresh authority is determined with reference to the valid date and time, and deletion is not indispensable. However, efficiency of a storage area can be enhanced by deletion. Note that when a refresh token is used once to execute refresh processing, it is invalidated.

The relationship between the authorization information management tables shown in FIGS. 6A and 9 will be briefly described below. The authorization information management table 600 managed by the external service system 103, that is, the client stores the latest access token and refresh token and its initial refresh token as client authorization related information in association with one access authority. The authorization information management table 900 managed by the access management service system 104, that is, the authorization server stores full authorization related information including a valid access token or valid refresh token in association with one access authority. For this reason, as long as tokens are updated by appropriate refresh processing, the latest access token and refresh token are kept synchronized between the external service system 103 (client) and access management service system 104 (authorization server) by a sequence to be described later. However, when illicit refresh processing (also called re-issuance processing or update processing) is executed due to leakage of a refresh token and client credentials, that synchronization is lost.

The authorization information management tables shown in FIGS. 6A and 9 exemplify that state. In the authorization information management table 900 shown in FIG. 9, three sets of authorization information are registered in association with an access authority having "EFGH5678" as an initial access token. Of these pieces of information, the latest access token is "MNOP3456", the latest refresh token is "8901IJKL", and the initial refresh token is "0123ABCD". By contrast, in the authorization information management table 600 shown in FIG. 6A, an access token corresponding to the initial refresh token "0123ABCD" is "IJKL9012", and a corresponding refresh token is "4567EFGH". Although these access token and refresh token are also stored in the authorization information management table 900, they are not the latest ones. That is, the synchronization is lost. A cause of such lost synchronization is, for example, illicit refresh processing or the like, which is requested by a third party who originally does not have any authority using the leaked refresh token and client credentials, as described above.

The details of processing of data stored in the data structure in FIG. 9 will be described later.

<Access Token Issuance Processing>

The processing sequences of the present invention will be described hereinafter with reference to the flowcharts.

FIGS. 10A and 10B show an access token issuance sequence for issuing an access token which is issued by the access management service system 104 and is required to permit the external service system 103 to use the form service system 105. In FIGS. 10A and 10B, the external service system 103 and form service system 105 are online service systems managed by different service providers. The access management service system 104 controls accesses to the form service system 105 from users including another service. The external service system 103 provides a service using form data provided by the form service system 105, for example, a print service to users.

In this case, in order to permit the external service system 103 to use the form service system 105, a user who issued a form generation instruction to the external service system 103 has to be that of both of the external service system 103 and form service system 105. Also, the external service system 103 actually transmits a form generation request to the form service system 105. For this reason, the external service system 103 has to be a user of the form service system 105. On that basis, within an authority range of the user who issued the form generation instruction, the external service system 103 has to be able to use the form service system 105. More specifically, the user who issues a service request to the external service system 103 has to permit the external service system 103 to use the form service system, and to authorize use of the form service system 105 by the external service system 103. Note that in the following description, a user who operates the information terminal 102 will be referred to as "user".

In step S1001, the information terminal 102A executes a user agent such as a Web browser, and accepts an operation by a user A. When the user A operates the information terminal 102A and issues a form generation instruction to the external service system 103, that form generation instruction is transmitted to, for example, a Web service executed by the external service system 103 via the network.

Note that the information terminal 102A and external service system 103 are connected via HTTP in this example, and core processing by the external service system 103 to be described in this sequence is executed as its backend. However, a description about an HTTP part will not be given in the following description.

In step S1002, the external service system 103 accepts the form generation instruction from the information terminal 102A. After that, the external service system 103 confirms whether or not it possesses an access token to the form service system 105 in the authorization information management table 600. If the external service system 103 possesses an access token to the form service system 105, it ends the access token issuance sequence. If the external service system 103 does not possess any access token to the form service system 105, it transmits an authorization request to the access management service system 104 in step S1003.

In step S1004, upon reception of the authorization request from the external service system 103, the access management service system 104 generates an authentication screen (not shown) which prompts the user A to undergo authentication processing, and transmits that screen to a Web browser (not shown) included in the information terminal 102A to display the screen on the browser.

In step S1005, the user A inputs a user ID and password to the authentication screen displayed on the Web browser of the information terminal 102A as authentication information. The information terminal 102A sends an input authentication request to the access management service system 104.

In step S1006, the access management service system 104 receives the authentication request from the information terminal 102, and verifies the user ID and password. More specifically, the access management service system 104 determines whether or not a combination of the user ID and password included in the authentication request is registered in the user table 700 stored in the authentication data manager 403.

If the combination of the received user ID and password is registered in the user table 700, the access management service system 104 judges the user A who operates the information terminal 102 as a user of the form service system 105, and the process advances to step S1009 to continue processing.

In step S1009, the access management service system 104 generates an authorization screen 1100 (to be described later), and transmits that screen to the Web browser (not shown) included in the information terminal 102.

In step S1010, the Web browser included in the information terminal 102 receives and displays the authorization screen 1100. When the user presses an authorization button 1102 on the authorization screen 1100, the information terminal 102A transmits an authorization approval to the access management service system 104.

In step S1011, the access management service system 104 generates an authorization code based on the received authorization approval, and stores that code in the authorization code table 800 managed by the authorization data manager 404 in association with the authorized user ID. Furthermore, the access management service system 104 redirects the Web browser (not shown) included in the information terminal 102A to the external service system 103, and returns the generated authorization code to the external service system 103 as a response to the request in step S1003.

In step S1012, the external service system 103 stores the received authorization code in the authorization code table 610. After that, the external service system 103 transmits an access token request as an issuance request of an access token together with the authorization code and a client ID and password stored in the authentication information table 620 to the access management service system 104.

In step S1013, the access management service system 104 receives the access token request, and authenticates the external service system 103. More specifically, the access management service system 104 determines whether or not a combination of the client ID and password included in the access token request is registered in the client table 710 stored in the authentication data manager 403.

If the combination of the client ID and password is registered in the client table 710, the access management service system 104 judges the external service system 103 which issued the access token request as a user of the form service system 105. After the access management service system 104 authenticates the external service system 103, the process advances to step S1014 to continue processing.

In step S1014, the access management service system 104 verifies the authorization code included in the access token request. More specifically, the access management service system 104 determines whether or not the authorization code received together with the access token request is registered in the authorization code table 800 stored in the authentication data manager 403.

If the authorization code is registered in the authorization code table 800, the access management service system 104 judges that the user permits use of the form service system 105, and the process advances to step S1016 to continue processing.

In step S1016, the access management service system 104 generates an access token and refresh token, and stores the generated tokens in the authorization information management table 900 managed by the authorization data manager 404. In this case, the access management service system 104 sets the generation times of the tokens in the access token issuance date and time 902 and refresh token issuance date and time 905. Also, the access management service system 104 sets a valid period of the access token in the access token valid date and time 903, and that of the refresh token in the refresh token valid date and time 906. The access management service system 104 sets, as user information, the user ID who issued the successfully verified authorization code in the user ID 907. Then, the access management service system 104 sets refresh token information issued first in the initial refresh token ID 908.

In this embodiment, when an access token and refresh token are issued when the user uses the cooperative system for the first time, "null" which means that a corresponding refresh token is not available is set in the initial refresh token ID 908. Note that the same value as the refresh token ID 904 may be set in the initial refresh token ID 908 as issued refresh token information.

After that, the access management service system 104 returns the generated access token and refresh token to the external service system 103 as a response of step S1013.

In step S1017, the external service system 103 stores the received access token and refresh token in the authorization information management table 600 managed by the token manager 305. More specifically, the external service system 103 sets the received access token in the access token ID 602, and sets the received refresh token in the refresh token ID 603 and initial refresh token ID 604.

By saving the issued access token and refresh token in this way, the access token issuance sequence ends.

On the other hand, if the combination of the received user ID and password is not registered in the user table 700 in step S1006, the access management service system 104 judges that the user A who operates the information terminal 102A is not a user of the form service system 105. After that, the access management service system 104 returns an authentication error to the external service system 103 as a response of step S1004. In step S1007, upon reception of the authentication error, the external service system 103 generates an authentication error screen (not shown), and sends that screen to the information terminal 102A. After that, in step S1008, the Web browser (not shown) included in the information terminal 102 receives and displays the error screen, thus ending the processing.

On the other hand, if the combination of the client ID and password is not registered in the client table 710 in step S1013, the access management service system 104 judges that the external service system 103 which issued the access token request is not a user of the form service system 105. After that, the access management service system 104 transmits an authentication error to the external service system 103, and the process advances to step S1015.

If the authorization code is not registered in the authorization code table 800 in step S1014, the access management service system 104 judges that the user does not permit use of the form service. After that, the access management service system 104 transmits an authorization error to the external service system 103, and the process advances to step S1015.

In step S1015, the external service system 103 receives the authentication error or authorization error from the access management service system 104. The external service system 103 generates an authentication or authorization error screen (not shown) corresponding to the received error, and sends that screen to the information terminal 102.

In step S1008, the information terminal 102A displays the received error screen, thus ending the processing.

Since the access token issued by the aforementioned sequence is saved and managed by the client, that is, the external service system 103, and is used to access the resource server, that is, the form service system 104, the external service system 103 can use the access authority of the user to the form service system 105 without receiving any disclosure of user credentials.

<Screen Example>

Figure 11:
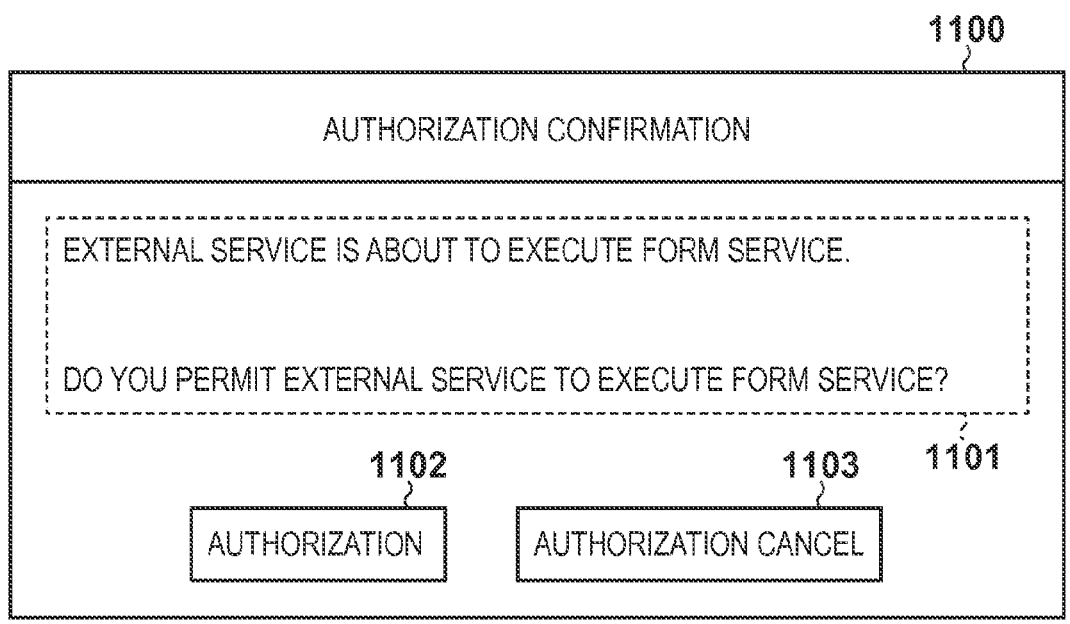
FIG. 11 shows an example of an authorization screen.

FIG. 11 shows the authorization screen generated by the access management service system 104 in step S1004. The authorization screen 1100 includes an information display area 1101, authorization button 1102, and authorization cancel button 1103. The information display area 1101 presents information of a service to be authorized and a service to be executed by the authorized service to the user. In this embodiment, the service to be authorized indicates the external service system 103, and the service to be executed by the authorized service indicates the form service system 105. The user presses the authorization button 1102 when he or she approves authorization. The user presses the authorization cancel button 1103 when he or she rejects authorization.

<Access Sequence for Form Service System>

FIGS. 12A and 12B show the sequence of authorization processing executed when the user permits the external service system 103 to use the form service system 105. The sequence shown in FIGS. 12A and 12B includes the token issuance sequence shown in FIGS. 10A and 10B, and also a sequence executed when the external service system 103 accesses the form service system 105.

Steps S1001 and S1002 are the same as those in the sequence described using FIG. 10A. Also, step S1201 represents the access token issuance sequence from step S1003 to step S1017 in FIGS. 10A and 10B. Although FIGS. 12A and 12B show this step as the processing of the external service system 103 for the sake of descriptive convenience, tokens are issued in cooperation with other systems in practice, as described in FIGS. 10A and 10B. If an access token for a requested service is not available, a new access token is issued in step S1201.

In step S1202, the external service system 103 sends a form generation request to the form service system 105 using the access token which is stored in the authorization information management table 600 and is required to use the form service system. That is, the client transmits an access request required to request a service to the resource server. Note that use is to transmit, together with a service request message, an access token indicating that a request source has been authorized in association with that request to a request destination. Assume that the external service system 103 passes an access token "IJKL9012".

In step S1203, the form service system 105 requests the access management service system 104 to verify the access token sent together with the form generation request.

In step S1204, the access management service system 104 verifies the received access token. More specifically, the access management service system 104 determines whether or not the received access token is registered in the authorization information management table 600. If the access token is registered, the access management service system 104 determines whether or not the access token falls within the valid period. If the access token is registered and falls within the valid period, the access management service system 104 returns an access token valid message as a response. If the access token is not registered or if the access token is registered but it falls outside the valid period, the access management service system 104 returns an access token invalid message as a response. Assume that the verification time is "15:00, Apr. 1, 2011", and the access token "IJKL9012" is passed. In this case, although the access token "IJKL9012" is registered in the authorization information management table 900 but a time set in the access token valid date and time 903 has elapsed, it is judged that the access token is invalid.

In step S1205, the form service system 105 receives the access token verification result returned from the access management service system 104. If the access token is valid, the form service system 105 permits access of a form generation function, and the process advances to step S1206. If the access token is invalid, the form service system 105 returns an access token invalid message to the external service system 103 as a response of step S1203, and the process advances to step S1209.

In step S1206, the form service system 105 generates a form, and returns the generated form data to the external service system 103 as a response of step S1203.

In step S1207, the external service system 103 receives the form data from the form service system 105, and transmits the form data to the information terminal 102A.

In step S1208, the information terminal 102A displays the received form data on its Web browser (not shown), thus normally ending the form generation instruction.

(Token Re-Issuance Processing)

In step S1209, upon reception of the access token invalid message, the external service system 103 requests the access management service system 104 to execute refresh processing. More specifically, the external service system 103 sends a refresh processing request to the access management service system 104 together with a refresh token of the form service system 105 saved in the authorization information management table 600 and a client ID and password for the form service system 105. Assume that the external service system 103 passes a refresh token "4567EFGH".

In step S1210, the access management service system 104 verifies the external service system 103. More specifically, the access management service system 104 determines whether or not the combination of the client ID and password included in the refresh processing request is registered in the client table 710 stored in the authentication data manager 403.

If the combination of the client ID and password is registered in the client table 710, the access management service system 104 judges that the form service system 105 permits cooperation with the external service system 103, and the process advances to step S1213 to continue processing.

If the combination of the client ID and password is not registered in the client table 710, the access management service system 104 returns an authentication error to the external service system 103, and the process advances to step S1211.

In step S1211, upon reception of the authentication error, the external service system 103 generates an authentication error screen (not shown) and sends that screen to the information terminal 102A. After that, in step S1212, the error screen is displayed on the Web browser (not shown) included in the information terminal 102, thus ending the processing.

In step S1213, the access management service system 104 verifies the refresh token sent together with the refresh processing request. More specifically, the access management service system 104 determines whether or not the received refresh token is registered in the authorization information management table 600. If the refresh token is registered, the access management service system 104 further determines whether or not the refresh token falls within the valid period. If the received refresh token is registered and falls within the valid period, the access management service system 104 judges that the refresh token is valid, and the process advances to step S1214 to continue processing.

If the received refresh token is not registered or if that token is registered but it falls outside the valid range, the access management service system 104 judges that the refresh token is invalid, and returns a token invalid message to the external service system 103 as a response. Then, the process advances to step S1217. Assume that the refresh token "4567EFGH" is passed at "14:30, Apr. 1, 2011". In this case, although the refresh token "4567EFGH" is registered in the authorization information management table 900, but a time set in the refresh token valid date and time 906 has elapsed, it is judged that the refresh token is invalid.

In step S1214, the access management service system 104 generates a new access token and refresh token, and stores these tokens in the authorization information management table 900 managed by the authorization data manager 404. In this case, the access management service system 104 acquires a value of the initial refresh token ID 908 set in association with the refresh token verified in step S1210 from the authorization information management table 900, and registers that value as an initial refresh token of the newly stored token. Note that when the value of the initial refresh token ID 908 is "null", the access management service system 104 registers the refresh token used in verification as an initial refresh token.

In step S1215, the access management service system 104 invalidates the refresh token used in verification. More specifically, the access management service system 104 updates a value of the refresh token valid date and time 906 to a value of the refresh token issuance date and time 905 in association with the corresponding refresh token in the authorization information management table 900. Note that this embodiment invalidates the refresh token by updating the refresh token valid date and time, but the refresh token may be invalidated by other methods. For example, an item of a refresh token valid flag may be defined in the authorization information management table 900, and the refresh token may be invalidated by updating a value of that item. After that, the access management service system 104 returns the newly issued access token and refresh token to the external service system 103 as a response of step S1210.

In step S1216, the external service system 103 updates the values of the access token and refresh token of the form service system 105, which are registered in the authorization information management table 600, by the received access token and refresh token. More specifically, the external service system 103 respectively sets the received access token and refresh token in the access token ID 602 and the refresh token ID 603 of the form service system registered in the authorization information management table 600. In this case, the external service system 103 does not update the initial refresh token ID 604.

After that, the process returns to step S1202, and the external service system 103 issues a form generation request again.

In step S1217, upon reception of the refresh token invalid response, the external service system 103 requests to invalidate authorization information. More specifically, the external service system 103 sends a value of the initial refresh token of the form service system registered in the authorization information management table 600 to the access management service system 104. Assume that the external service system 103 passes "0123ABCD" as the value of the initial refresh token.

In step S1218, the access management service system 104 executes token invalidation processing (to be described later).

In step S1219, the external service system 103 deletes authorization information of the form service system 105. More specifically, the external service system 103 deletes values of the access token ID 602, refresh token ID 603, and initial refresh token ID 604 of the form service system 105 registered in the authorization information management table 600.

After that, the process returns to step S1201, and the external service system 103 executes the access token issuance processing again.

(Access Token Invalidation Processing)

In step S1217, the external service system 103 requests the access management service system 104 to execute refresh token invalidation processing using the initial refresh token as a characteristic feature of this embodiment. In this case, the external service system 103 transmits the initial refresh token for the form service system 105, which token is registered in the authorization information management table 600, together with the invalidation processing request. The access management service system 104, which received the invalidation processing request, executes the refresh token invalidation processing of the received refresh token registered as the initial refresh token in step S1218. Details of this processing will be described later with reference to FIG. 13. After the refresh token invalidation processing is complete, the access management service system 104 returns an invalidation completion response to the external service system 103. The external service system 103, which received the response, deletes the client authorization related information including the invalidated refresh token from the authorization information management table 600 in step S1219. Note that at the time of step S1219, the access token has already been invalidated. After that, the process returns to step S1201, and the external service system 103 executes processing for issuing a new access token and refresh token again. Note that the external service system 103 may transmit the set of the client ID and password for the form service system 105 together as in the refresh processing request, although such transmission is not required in this example. In this case, the access management service system 104 authenticates the authority as in step S1210 immediately before step S1218. If the authentication has succeeded, the access management service system 104 invalidates the refresh token in step S1218.

<Refresh Token Invalidation Processing Sequence>

FIG. 13 shows the detailed sequence of the refresh token invalidation processing according to the first embodiment, that is, step S1218 in FIG. 12B. In step S1301, the access management service system 104 accepts the refresh token together with the refresh token invalidation request. Assume that a refresh token "0123ABCD" is passed.

In step S1302, the access management service system 104 invalidates all refresh tokens, the initial refresh token of which is the received refresh token. More specifically, the access management service system 104 invalidates refresh tokens corresponding to the received refresh token registered in their refresh token ID 908 of the authorization information management table 900. For example, invalidation is attained by updating the value of the refresh token valid date and time 906 to that of the refresh token issuance date and time 905. In the current example, refresh tokens "4567EFGH" and "8901IJKL" corresponding to the value "0123ABCD" of the initial refresh token ID 908 are selected as targets. However, since the refresh token "4567EFGH" has already been invalidated, only the refresh token "8901IJKL" is invalidated.

In step S1303, the access management service system 104 invalidates the received refresh token. More specifically, the access management service system 104 updates the value of the refresh token valid date and time 906 to that of the refresh token issuance date and time 905 in association with corresponding refresh tokens in the authorization information management table 900. Note that when an access token and refresh token are issued for the first time, and the issued refresh token is registered as an initial refresh token, since that refresh token is also invalidated in step S1302, this step may be omitted. Also, the sequence for invalidating a refresh token corresponding to an initial refresh token "null" is a conventional invalidation method defined in OAuth. In the current example, a refresh token "0123ABCD" is selected as a target. However, since the refresh token "0123ABCD" has already been invalidated, no refresh token is invalidated in this step.

Note that when the received refresh token corresponds to none of the initial refresh tokens in the authorization information management table 900, nothing is executed in step S1302. In this manner, compatibility with a client which issues an invalidation request in the conventional OAuth sequence can be maintained.

With these processes, all refresh tokens issued by a series of refresh processes based on a refresh token issued first are invalidated.

(Effect of this Embodiment)

A refresh token is invalid in two patterns, that is, when the valid period has expired without any refresh processing, and when that refresh token is invalidated as a result of issuance of a new refresh token by executing the refresh processing.

Since the external service system 103 stores the latest refresh token, if the valid period has expired without any refresh processing, all refresh tokens for the form service system should be invalid. For this reason, even when all refresh tokens for the form service system, no influence is imposed on the system.

On the other hand, when the refresh token is invalid as a result of the refresh processing, unknown refresh processing to the external service system 103 is executed. For example, an illicit external service system (not shown) executes refresh processing in such a case. In this case, the illicit external service system is likely to use the form service system 105 on behalf of the external service system 103. Even in such case, by executing invalidation of refresh tokens according to this embodiment, an illicitly issued refresh token is also invalidated. For this reason, refresh processing by the illicit external service system after the invalidation processing can be prevented. Thus, the form service can be prevented from being continuously and illicitly used by the illicit external service system.

Second Embodiment

The second embodiment required to practice the present invention will be described below with reference to the drawings. In the first embodiment, all refresh tokens issued by a series of refresh processes based on a refresh token issued first are invalidated.

This embodiment will explain a method of immediately preventing spoofing by an illicit external service system in the first embodiment by invalidating an access token together when a refresh token is invalidated. Note that in this embodiment, a description of the same parts as in the first embodiment will not be repeated, and only a difference will be explained. Note that the difference is that the sequence of FIG. 13 is replaced by that of FIG. 14, and a practical example of that sequence will be explained below.

<Invalidation Processing Sequence>

FIG. 14 shows the sequence of authorization information invalidation processing according to the second embodiment. Steps S1301 to S1303 are the same as those in FIG. 13.

In step S1401, an access management service system 104 invalidates access tokens corresponding to refresh tokens which are invalidated in steps S1302 and S1303. More specifically, the access management service system 104 updates a value of access token valid date and time 903 to that of access token issuance date and time 902 in association with data in which invalidated refresh tokens are registered in an authorization information management table 900. Note that invalidation is attained by updating the valid date and time of an access token, but it may be attained by other methods. For example, an item of an access token valid flag may be defined in the authorization information management table 900, and invalidation may be attained by updating a value of that item. Assume that a refresh token "0123ABCD" is passed at "14:30, Apr. 1, 2011" in step S1301. In this case, refresh tokens "0123ABCD", "4567EFGH", and "8901IJKL" are selected as invalidation targets. For this reason, access tokens "EFGH5678", "IJKL9012", and "MNOP3456" are invalidated. However, since the access tokens "EFGH5678" and "IJKL9012" have already been invalidated, only the access token "MNOP3456" is invalidated.

With these processes, all refresh tokens and all access tokens, which are issued by refresh processes executed based on a refresh token issued first, are invalidated.

By invalidating refresh tokens by the method described in the first embodiment, refresh processing from an illicit external service system can be prevented. Furthermore, access tokens can also be invalidated by the method described in the second embodiment. Thus, even when refresh processing is executed by the illicit external service system, and a form service is illicitly used, use of the form service from the illicit external service system can be immediately stopped.

Also, an authorization server which implements the invention according to this embodiment not only supports a client which implements the invention according to this embodiment, but also can maintain compatibility with a client which implements the conventional OAuth protocol.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-120140, filed May 25, 2012, which is hereby incorporated by reference herein in its entirety.

The invention claimed is:

1. An authorization server, which authorizes an access request from a client apparatus to a resource server based on a valid access token received from the client apparatus in association with the request, the server comprising:
   a processor;
   and a memory storing instructions that, when executed by the processor, cause the server to execute:
   an issuance step of issuing an access token used to access the resource server and a refresh token used to re-issue a new access token in accordance with an issuance request received from the client apparatus, wherein the refresh token is a first refresh token that has been issued first based on an authorization request from the client apparatus;
   a re-issuance step of re-issuing a new access token and a new refresh token in accordance with a refresh processing request received together with the refresh token, and storing the refresh token issued by the issuance step so as to re-issue a new refresh token and access token as initial update authorization information in association with the re-issued access token and refresh token;
   and an invalidation step of invalidating, in accordance with an invalidation request received together with the refresh token, a refresh token with which the received refresh token is associated as initial update authorization information,
   wherein the refresh token received in the invalidation step together with the invalidation request is the first refresh token issued in the re-issuance step before re-issuance of a refresh token in accordance with an authorization request from the client apparatus,
   and wherein, where the first refresh token is received in the re-issuance step together with the invalidation request after re-issuance of a new refresh token, both the new refresh token and the first refresh token are invalidated.

2. The server according to claim 1, wherein the invalidation step further invalidates the received refresh token, and
   wherein the invalidation step invalidates the access token with which the received refresh token is associated as initial update authorization information in addition to the refresh token with which the received refresh token is associated as initial update authorization information.

3. The server according to claim 1, wherein when the reissuance step re-issues a new access token, the re-issuance step invalidates the refresh token received together with a refresh processing request.

4. A client apparatus which transmits an access request to a resource server together with an access token issued by an authorization server to request a service by the resource server, the client apparatus comprising:
   a processor;
   and a memory storing instructions that, when executed by the processor, cause the client to execute:
   a storage step of storing in a storage unit device the access token issued by the authorization server, a refresh token used to re-issue a new access token, and initial update authorization information issued first by the authorization server so as to re-issue the access token, in association with each other; and
   an invalidation request step of transmitting an invalidation request together with the stored initial update authorization information as a first refresh token that has been issued first to the authorization server to request the authorization server to invalidate the refresh token associated with the initial update authorization information,
   wherein the refresh token transmitted in the invalidation request step together with the invalidation request is the first refresh token issued before re-issuance of a new refresh token by the authorization server in accordance with the authorization request from the client apparatus,
   and wherein, where the first refresh token is received by the authorization server together with the invalidation request after re-issuance of a new refresh token, both the new refresh token and the first refresh token are invalidated.

5. The apparatus according to claim 4, further comprising a transmission step of, when a response indicating that the access token is invalid is received in response to the access request, transmitting a refresh processing request to the authorization server together with the refresh token associated with the access token corresponding to the response indicating that the access token is invalid, wherein when a response indicating that the refresh token is invalid is received in response to the refresh processing request, the invalidation request step requests to invalidate the refresh token.

6. A server cooperative system including an authorization server, which authorizes an access request from a client apparatus to a resource server based on a valid access token received from the client apparatus in association with the request, a client apparatus, which transmits an access request to a resource server together with the access token issued by the authorization server to request a service by the resource server, and the resource server, which provides a service to the client apparatus, the authorization server comprising:
a processor;
and a memory storing instructions that, when executed by the processor, cause the authorization server to execute:
an issuance step of issuing an access token used to access the resource server and a refresh token used to re-issue a new access token in accordance with an issuance request received from the client apparatus, wherein the refresh token is a first refresh token that has been issued first based on an authorization request from the client apparatus;
a re-issuance step of re-issuing a new refresh token and a new access token in accordance with a refresh processing request received together with the refresh token, and storing the refresh token issued by the issuance step so as to re-issue a new refresh token and an access token as initial update authorization information in association with the re-issued access token and refresh token;
and an invalidation step of invalidating, in accordance with an invalidation request received together with the refresh token a refresh token with which the received refresh token is associated as initial update authorization information,
wherein the refresh token received in the invalidation step together with the invalidation request is a first refresh token issued in the re-issuance step before re-issuance of a new refresh token in accordance with an authorization request from the client apparatus,
and wherein, where the first refresh token is received in the re-issuance step together with the invalidation request after re-issuance of a new refresh token, both the new refresh token and the first refresh token are invalidated,
and the client apparatus comprising:
a processor;
and a memory storing instructions that, when executed by the processor, cause the client to execute:
a storage step of storing in a storage device the access token issued by the authorization server, the refresh token used to re-issue a new access token, and initial update authorization information issued first by the authorization server so as to re-issue the access token, in association with each other;
and an invalidation request step of transmitting an invalidation request together with the stored initial update authorization information as a first refresh token that has been issued first to the authorization server to request the authorization server to invalidate a refresh token associated with the initial update authorization information.

7. A non-transitory computer-readable storage medium storing computer-executable code of a program for controlling a computer to function as an authorization server, which authorizes an access request from a client apparatus to a resource server based on a valid access token received from the client apparatus in association with the request, the program comprising:

code of an issuance step for issuing an access token used to access the resource server and a refresh token used to re-issue a new access token accordance with an issuance request received from the client apparatus, wherein the refresh token is a first refresh token that has been issued first based on an authorization request from the client apparatus;
code of a re-issuance step for re-issuing a new refresh token and a new access token in accordance with a refresh processing request received together with the refresh token,
and storing the refresh token issued by the issuance step so as to re-issue a new refresh token and an access token as initial update authorization information in association with the re-issued access token and refresh token;
and code of an invalidation step for invalidating, in accordance with an invalidation request received together with the refresh token, a refresh token with which the received refresh token is associated as initial update authorization information, wherein the refresh token received in the invalidation step together with the invalidation request is the first refresh token issued in the re-issuance step before re-issuance of a refresh token in accordance with an authorization request from the client apparatus,
and wherein, where the first refresh token is received in the re-issuance step together with the invalidation request after re-issuance of a new refresh token, both the new refresh token and the first refresh token are invalidated.

8. A non-transitory computer-readable storage medium storing computer-executable code of a program for controlling a computer to function as a client apparatus, which transmits an access request to a resource server together with an access token issued by an authorization server to request a service by the resource server, the program comprising:

code of a storage step for storing in a storage device the access token issued by the authorization server, a refresh token used to re-issue a new access token, and initial update authorization information issued first by the authorization server so as to re-issue the access token, in association with each other;
and code of an invalidation request step for transmitting an invalidation request together with the stored initial update authorization information as a first refresh token that has been issued first to the authorization server to request the authorization server to invalidate a refresh token associated with the initial update authorization information, wherein the refresh token transmitted in the invalidation request step together with the invalidation request is the first refresh token issued before re-issuance of a new refresh token by the authorization server in accordance with the authorization request from the client apparatus,
and wherein, where the first refresh token is received by the authorization server together with the invalidation request after re-issuance of a new refresh token, both the new refresh token and the first refresh token are invalidated.

9. A token management method in a server cooperative system including an authorization server, which authorizes an access request from a client apparatus to a resource server based on a valid access token received from the client apparatus in association with the request, a client apparatus, which transmits an access request to a resource server together with the access token issued by the authorization server to request a service by the resource server, and the resource server, which provides a service to the client apparatus, the method comprising:
- issuing, by the authorization server, an access token used to access the resource server and a refresh token used to re-issue a new access token in accordance with an issuance request received from the client apparatus, wherein the refresh token is a first refresh token that has been issued first based on an authorization request from the client apparatus;
- storing, by the client apparatus, the access token issued by the authorization server, the refresh token used to re-issue a new access token, and initial update authorization information issued first by the authorization server so as to re-issue the access token, in association with each other;
- transmitting, by the client apparatus, when a response indicating that the access token is invalid is received from the authorization server in response to the access request, a refresh processing request to the authorization server together with the refresh token associated with the access token corresponding to the response indicating that the access token is invalid;
- re-issuing, by the authorization server, a new refresh token and a new access token in accordance with a refresh processing request received together with the refresh token, and storing the refresh token issued in the issuing so as to re-issue a new refresh token and access token as initial update authorization information in association with the re-issued access token and refresh token;
- transmitting, by the client apparatus, an invalidation request together with the stored initial update authorization information as a first refresh token that has been issued first to the authorization server to request the authorization server to invalidate the refresh token associated with the initial update authorization information;
- and invalidating, by the authorization server, in accordance with an invalidation request received together with the refresh token a refresh token with which the received refresh token is associated as initial update authorization information,
- wherein the refresh token transmitted in the transmitting together with the invalidation request is the first refresh token issued before re-issuance of a new refresh token by the authorization server in accordance with the authorization request from the client apparatus,
- and wherein, where the first refresh token is received by the authorization server together with the invalidation request after re-issuance of a new refresh token, both the new refresh token and the first refresh token are invalidated.

* * * * *